United States Patent
Park et al.

(10) Patent No.: US 9,179,452 B2
(45) Date of Patent: Nov. 3, 2015

(54) METHOD FOR CONFIGURING AND TRANSMITTING AN HARQ ACK/NACK SIGNAL, AND DEVICE USING SAME

(75) Inventors: Dong Hyun Park, Seoul (KR); Ki Bum Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 169 days.

(21) Appl. No.: 13/978,690

(22) PCT Filed: Jan. 5, 2012

(86) PCT No.: PCT/KR2012/000131
§ 371 (c)(1),
(2), (4) Date: Jul. 8, 2013

(87) PCT Pub. No.: WO2012/093876
PCT Pub. Date: Jul. 12, 2012

(65) Prior Publication Data
US 2013/0279480 A1 Oct. 24, 2013

(30) Foreign Application Priority Data
Jan. 8, 2011 (KR) .......... 10-2011-0002030
Jan. 11, 2011 (KR) .......... 10-2011-0002678

(51) Int. Cl.
H04B 7/216 (2006.01)
H04W 72/04 (2009.01)
H04L 5/00 (2006.01)
H04L 1/18 (2006.01)

(52) U.S. Cl.
CPC .......... *H04W 72/0413* (2013.01); *H04L 1/1861* (2013.01); *H04L 5/001* (2013.01); *H04L 5/0055* (2013.01); *H04L 1/1812* (2013.01)

(58) Field of Classification Search
CPC ..... H04L 5/001; H04L 1/1812; H04L 5/0005; H04L 5/0055; H04L 1/00; H04L 1/0001; H04L 1/18; H04W 72/00; H04W 72/04; H04W 72/0413; H04W 72/042
See application file for complete search history.

(56) References Cited

U.S. PATENT DOCUMENTS

2010/0210256 A1* 8/2010 Shen et al. .......... 455/422.1
2010/0272048 A1* 10/2010 Pan et al. .......... 370/329

OTHER PUBLICATIONS

International Search Report issued on Sep. 27, 2012 in International Application No. PCT/KR2012/000131.
(Continued)

*Primary Examiner* — Anh Ngoc Nguyen
(74) *Attorney, Agent, or Firm* — H.C. Park & Associates, PLC

(57) ABSTRACT

The present invention relates to a method for configuring and transmitting an HARQ ACK/NACK signal by bundling said signal about a component carrier wave of a downlink subframe linked with an uplink subframe transmitting an HARQ ACK/NACK signal on PUCCH format 3. More particularly, the method comprises the steps of: determining a mode for bundling an HARQ ACK/NACK signal; and configuring the bundled HARQ ACK/NACK signal according to the determined bundling mode, wherein in the step of determining the bundling mode, all the component carriers of the downlink subframe transmitting the HARQ ACK/NACK signal to an uplink subframe are bundled when the downlink channel is in a worse state than the predetermined reference state, and some of the component carriers of the downlink subframe transmitting the HARQ ACK/NACK signal to an uplink subframe are bundled when the downlink channel is not in a worse state.

16 Claims, 43 Drawing Sheets

(56) References Cited

OTHER PUBLICATIONS

Nokia Siemens Networks, Nokia, "Channel selection details," 3GPP TSG RAN WG1 Meeting #62, R1-104427, Aug. 23-27, 2010, Madrid, Spain.

InterDigital Communications, LLC, "Open Issues for R10 TDD PUCCH A/N," 3GPP TSG-RSN WG1#63, R1-105946, Nov. 15-19, 2010, Jacksonville, FL, USA.

* cited by examiner

METHOD FOR CONFIGURING AND TRANSMITTING AN HARQ ACK/NACK SIGNAL, AND DEVICE USING SAME

CROSS-REFERENCE TO RELATED APPLICATIONS

This application is the National Stage Entry of International Application PCT/KR2012/000131, filed on Jan. 5, 2012, and claims priority from and the benefit of Korean Patent Application No. 10-2011-0002030, filed on Jan. 8, 2011 and Korean Patent Application No. 10-2011-0002678, filed on Jan. 11, 2011, all of which are incorporated herein by reference for all purposes as if fully set forth herein.

BACKGROUND

1. Field

The present invention relates to wireless communication and, more particularly, to a method for configuring and transmitting an HARQ ACK/NACK signal, and a device using the same in a wireless communication system supporting multiple carriers.

2. Discussion of the Background

In general, a wireless communication system uses a single bandwidth to transmit data. For example, a $2^{nd}$-generation wireless communication system uses a bandwidth ranging from 200 KHz to 1.25 MHz, and $3^{rd}$-generation wireless communication system uses a bandwidth ranging from 5 MHz to 10 MHz. In order to support increasing transmission capacity, recently, LTE (Long Term Evolution) of 3GPP (3rd Generation Partnership Project) or IEEE 802.16m extends the bandwidth to 20 MHz or higher. To increase transmission capacity, increasing the bandwidth may be essential, but it is not easy to assign a frequency band having a wide bandwidth, except for some areas in the world.

A carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a carrier aggregation (CA) environment. The multi-component carrier system performs both a narrow band and a broad band by using one or more carriers. For example, when an each carrier corresponds to a bandwidth of 5 MHz, a bandwidth of a maximum of 20 MHz may be supported by using four carriers.

In order to operate the multi-CC system, various control signals are required between a base station (BS) and a terminal. For example, exchanging ACK (ACKnowledgement)/NACK (Not-ACKnowledgement) information for performing HARQ (Hybrid Automatic Repeat reQuest), exchanging CQI (Channel Quality Indicator) indicating downlink channel quality, and the like, are required.

SUMMARY

An aspect of the present invention provides a method and an apparatus capable of transmitting an HARQ ACK/NACK signal by using a PUCCH format 3 even when a size of payload of the HARQ ACK/NACK signal exceeds 20 bytes.

Another aspect of the present invention provides a method and an apparatus capable of adjusting a size of payload to be transmitted by using bundling in case of transmitting an HARQ ACK/NACK signal by using a PUCCH format 3.

Another aspect of the present invention provides a method and an apparatus capable of adjusting a size of payload to be transmitted in consideration of a communication environment in case of transmitting an HARQ ACK/NACK signal by using a PUCCH format 3.

According to an aspect of the present invention, there is provided a method for transmitting an HARQ ACK/NACK signal from a mobile station (MS) using a PUCCH format 3 in a carrier aggregation environment, including: determining a mode for bundling HARQ ACK/NACK signals with respect to component carriers (CCs) in each received downlink subframe; and configuring a bundled HARQ ACK/NACK signal according to the determined bundling mode, wherein in the determining of a bundling mode, when a downlink channel state is poorer than a predetermined reference state, bundling may be performed on all the CCs of the downlink subframes for transmitting HARQ ACK/NACK signals in a single uplink subframe, and when the downlink channel state is not poorer than the predetermined reference state, bundling may be performed on some of CCs of the downlink subframes for transmitting the HARQ ACK/NACK signals in the single uplink subframe.

According to another aspect of the present invention, there is provided a method for configuring HARQ ACK/NACK signals by using bundling with respect to CCs of a downlink subframe associated with an uplink subframe that transmits an HARQ ACK/NACK signal in a PUCCH format 3, wherein a start component carrier (CC) in a downlink subframe to start bundling is determined according to a channel environment, bundling is performed on HARQ ACK/NACK signals by CCs, starting from a start CC, sequentially with respect to subframes along a frequency axis or sequentially with respect to CCs along a time axis, and when a payload size of bundled HARQ ACK/NACK signals and unbundled HARQ ACK/NACK signals is equal to or smaller than a predetermined size, the bundling is terminated, HARQ ACK/NACK signals to be transmitted as the bundled HARQ ACK/NACK signals and HARQ ACK/NACK signals to be transmitted as unbundled HARQ ACK/NACK signals are configured.

According to another aspect of the present invention, there is provided a method for configuring HARQ ACK/NACK signals by using a PUCCH format 3 in a carrier aggregation environment, including: determining a mode of spatial bundling by recognizing a channel state, and determining a scheme for configuring HARQ ACK/NACK signals by a mobile station (MS) according to the determined mode of spatial bundling; and transmitting information regarding the mode of the spatial bundling and the HARQ ACK/NACK signal configuration scheme to the MS. In the determining of the mode of the spatial bundling, the spatial bundling mode may be determined such that when an uplink channel state is worse than a predetermined reference state, the MS performs spatial bundling on the entire CCs of a downlink subframe for transmitting HARQ ACK/NACK signals in a single uplink subframe, and when the uplink channel state is not worse than the predetermined reference state, the MS performs spatial bundling on some of CCs of the downlink subframe for transmitting HARQ ACK/NACK signals in a single uplink subframe.

According to another aspect of the present invention, there is provided a method for transmitting an HARQ ACK/NACK signal by a mobile station (MS) in a multi-component carrier system, including: receiving a plurality of codewords in at least one component carrier (CC) of a single downlink subframe from a base station (BS); fully or partially bundling HARQ ACK/NACK signals with respect to the plurality of codewords, over the respective CCs; and transmitting the bundled HARQ ACK/NACK signals to a base station (BS).

According to another aspect of the present invention, there is provided a mobile station (MS) for transmitting an HARQ ACK/NACK signal in a multi-component carrier system, including: a transceiver unit configured to receive a plurality of codewords in at least one component carrier (CC) of a downlink subframe from a base station (BS) and transmit bundled HARQ ACK/NACK signals to the BS; and a controller configured to fully or partially bundle HARQ ACK/NACK signals with respect to the plurality of codewords over each CC on the basis of a spatial bundling scheme.

According to another aspect of the present invention, there is provided a method for receiving an HARQ ACK/NACK signal by a base station (BS) in a multi-component carrier system, including: recognizing quality of a downlink channel on the basis of uplink information transmitted from a mobile station (MS); determining a scheme of spatial bundling on the basis of the quality of the downlink channel; transmitting information regarding an HARQ ACK/NACK signal configuration scheme indicating the determined scheme of spatial bundling to a mobile station (MS); and receiving bundled HARQ ACK/NACK signals generated on the basis of the information regarding the HARQ ACK/NACK signal configuration scheme from the MS.

According to another aspect of the present invention, there is provided a base station (BS) for receiving an HARQ ACK/NACK signal in a multi-component carrier system, including: a transceiver unit configured to receive uplink information indicating downlink channel quality from a mobile station (MS) and receive bundled HARQ ACK/NACK signals generated on the basis of information regarding an HARQ ACK/NACK signal configuration scheme from the MS; and a controller configured to recognize quality of the downlink channel on the basis of the uplink information and determine a scheme of spatial bundling on the basis of the quality of the uplink channel. Here, the transceiver unit may transmit information regarding the HARQ ACK/NACK signal configuration scheme indicating the determined scheme of spatial bundling to the MS.

According to embodiments of the present invention, even when a size of payload of an HARQ ACK/NACK signal to be transmitted exceeds 20 bytes, an HARQ ACK/NACK signal can be effectively transmitted by using a PUCCH format 3.

According to embodiments of the present invention, when an HARQ ACK/NACK signal is transmitted by using a PUCCH format 3, a size of payload to be transmitted can be adjusted by using bundling.

According to embodiments of the present invention, in case of transmitting an HARQ ACK/NACK signal, a size of payload to be transmitted can be adjusted in consideration of a channel state, thus enhancing transmission efficiency of the HARQ ACK/NACK signal.

DETAILED DESCRIPTION OF THE ILLUSTRATED EMBODIMENTS

Hereinafter, in the present disclosure, some embodiments will be described in detail with reference to the accompanying drawings, in which like numbers refer to like elements throughout although they are shown in different drawings. In describing the present invention, if a detailed explanation for a related known function or construction is considered to unnecessarily divert the gist of the present invention, such explanation will be omitted but would be understood by those skilled in the art.

In the present disclosure, a wireless communication network will be described, and an operation performed in the wireless communication network may be performed in a process of controlling a network and transmitting data by a system (e.g., a base station (BS)) administering the corresponding wireless communication network or may be performed in a terminal (or a mobile station (MS)) connected to the corresponding wireless network.

Figure 1:
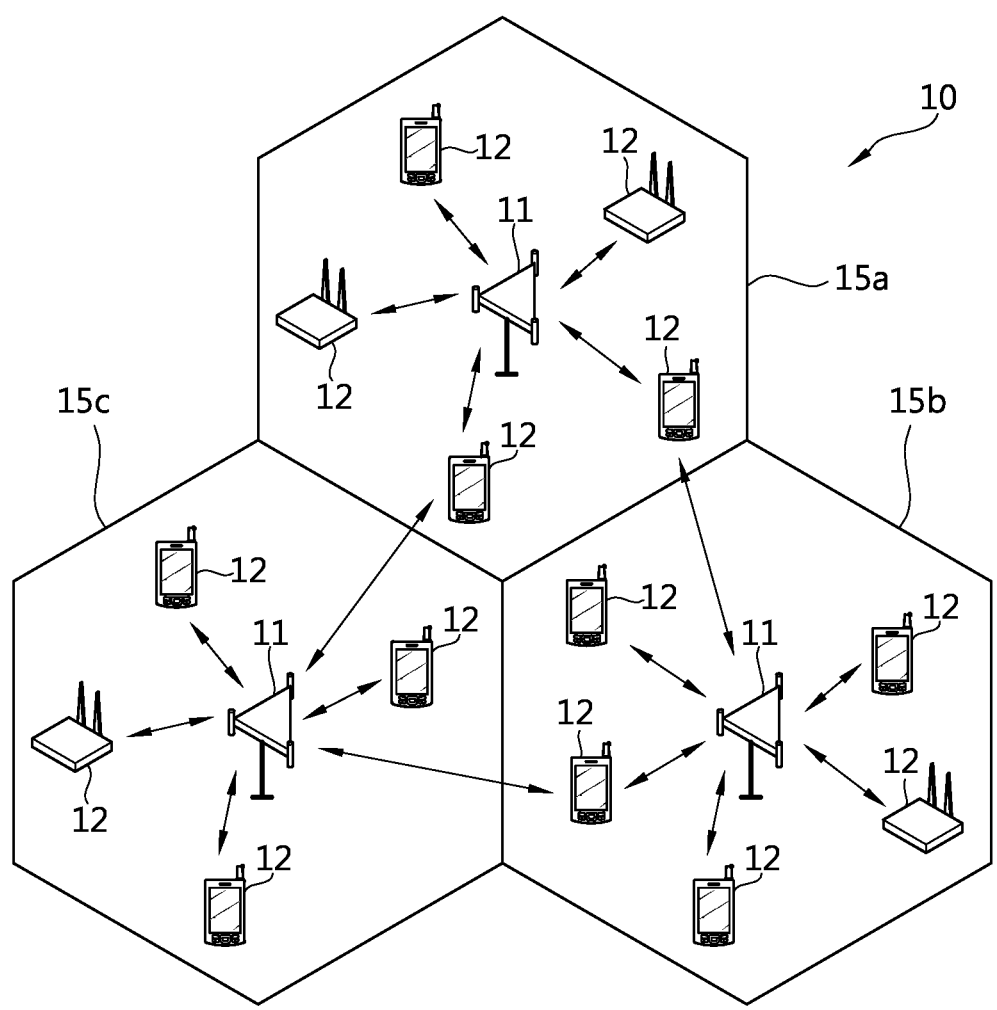
FIG. 1 is view illustrating a wireless communication system to which the present invention is applied.

FIG. 1 is view illustrating a wireless communication system to which the present invention is applied.

Referring to FIG. 1, a wireless communication system 10 is widely disposed to provide various communication services such as voice and packet data, or the like. The wireless communication system 10 includes at least one base station (BS). Each BS 11 provides a communication service to particular geographical areas or frequency areas (which is generally called cells) 15a, 15b, and 15c. The cells may be divided into a plurality of areas (which is generally called sectors).

A mobile station (MS) 12 may be fixed or mobile and may be referred to by other names such as user equipment (UE), mobile terminal (MT), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), a femto BS, a home nodeB, a relay, a remote radio head (RRH), etc. Cells 15a, 15b, and 15c may be construed to have comprehensive meanings indicating partial areas covered by the BS 11, and may include various coverage areas such as a mega-cell, a macro-cell, a micro-cell, a pico-cell, a femto-cell, and the like.

Hereinafter, downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

A carrier aggregation (CA) supports a plurality of carriers, which is also called a spectrum aggregation or a bandwidth aggregation. Carrier aggregation is introduced to support increased throughput, prevent an increase in cost otherwise caused by an introduction of a broadband radio frequency (RF) element, and guarantee compatibility with an existing system. For example, when five component carriers are allocated as granularity of carrier unit having a 5 MHz bandwidth, a maximum 25 MHz bandwidth can be supported.

The carrier aggregation can be divided into a contiguous carrier aggregation made among component carriers consecutive in a frequency domain and a non-contiguous carrier aggregation made among component carriers inconsecutive the frequency domain. An aggregation in which the number of downlink component carriers is equal to the number of uplink component carriers is called a symmetric aggregation, and an aggregation in which the number of downlink component carriers is equal to the number of uplink component carriers is called an asymmetric aggregation.

Sizes (i.e., bandwidths) of component carriers may vary. For example, when five component carriers are used to configure a 70 MHz band, the five carriers may be configured as follows: 5 MHz carrier (carrier #0)+20 MHz carrier (carrier #1)+20 MHz carrier (carrier #2)+20 MHz carrier (carrier #3)+5 MHz carrier (carrier #4).

Hereinafter, a multi-carrier system refers to a system supporting the carrier aggregation. In the multi-carrier system, the contiguous carrier aggregation and/or a non-contiguous carrier aggregation may be used, or any of the symmetrical aggregation and the asymmetrical aggregation may be used.

Figure 2:
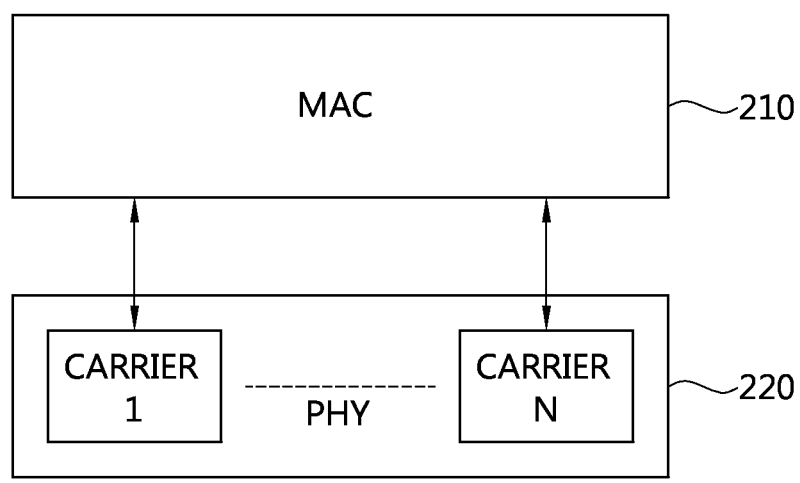
FIG. 2 is a view illustrating an example of a protocol structure for supporting multiple carriers to which the present invention is applied.

FIG. 2 is a view illustrating an example of a protocol structure for supporting multiple carriers to which the present invention is applied.

Referring to FIG. 2, a common medium access control (MAC) entity 210 manages a physical (PHY) layer 220 using a plurality of carriers. A MAC management message transmitted in a particular carrier may be applied to a different carrier. Namely, the MAC management message, including a particular carrier, can control other carriers. The PHY layer 220 may operate according to TDD (Time Division Duplex) and/or FDD (Frequency Division Duplex).

Some physical control channels are used in the PHY layer 220. A PDCCH to (physical downlink control channel) provides information regarding resource allocation of a PCH (paging channel) and a PDSCH (physical downlink shared channel and HARQ (hybrid automatic repeat request) information related to the PDSCH to the MS. The PDCCH may carry an uplink grant informing the MS about a resource allocation of uplink transmission and a downlink grant informing the MS about resource allocation of downlink transmission. A PCFICH (physical control format indicator channel) is a physical channel transmitting a format of a PDCCH, i.e., a format indicator indicating a number of OFDM symbols constituting the PDCCH, to the MS, which is included in every subframe. The format indicator may also be called a control format indicator (CFI).

A PHICH (physical Hybrid ARQ Indicator Channel), a response to an uplink transmission, carries an HARQ ACK/NAK signal. A PUCCH (Physical uplink control channel) carries a HARQ ACK/NAK signal with respect to a downlink transmission, a scheduling request, a sounding reference signal (SRS), and uplink control information such as CQI, or the like. A PUSCH (Physical uplink shared channel) carries an UL-SCH (uplink shared channel).

Figure 3:
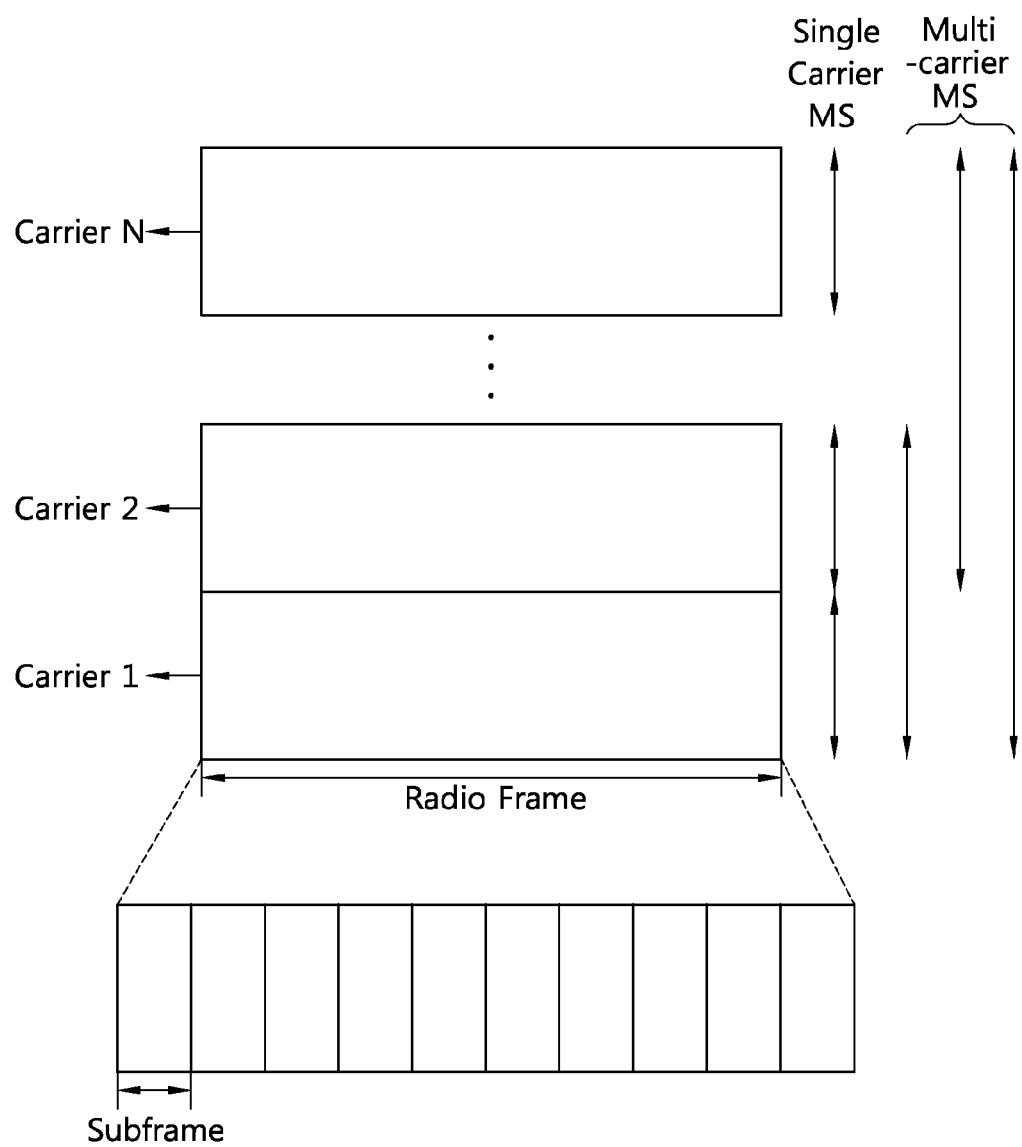
FIG. 3 is a view illustrating an example of a frame structure for a multi-carrier operation to which the present invention is applied.

FIG. 3 is a view illustrating an example of a frame structure for a multi-carrier operation to which the present invention is applied.

Referring to FIG. 3, a radio frame includes 10 subframes. Each of the subframes a plurality of OFDM symbols. Each carrier may have its own control channel (e.g., a PDCCH). Multiple carriers may be adjacent to each other or may not. The MS may support one or more carriers according to capability thereof.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. The MS may use only one primary component carrier or one or more secondary component carriers along with a primary component carrier. The MS may be allocated a primary component carrier and/or a secondary component carrier from the BS.

A PCC is a carrier by which primary control information items are exchanged between a BS and an MS. An SCC is a carrier allocated according to a request from an MS or an instruction from a BS. A PCC may be used for an MS to enter a network and/or may be used to allocate an SCC. A PCC may be selected from among entire set carriers, rather than being fixed to a particular carrier. A carrier set as an SCC may also be changed into a PCC.

Figure 4:
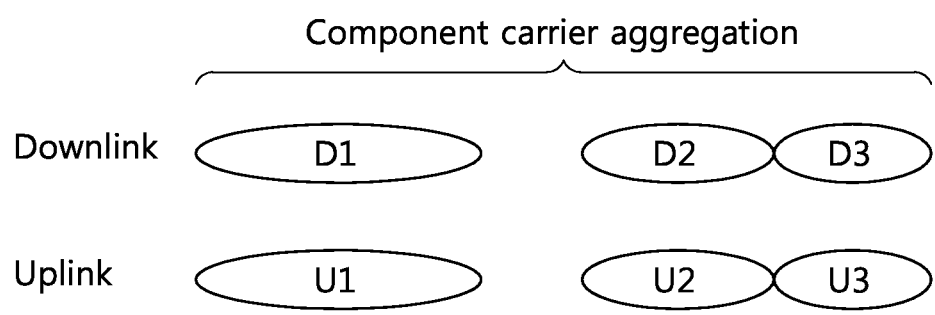
FIG. 4 is a view illustrating a linkage between downlink component carriers and uplink component carriers in a multi-carrier system to which the present invention is applied.

FIG. 4 is a view illustrating a linkage between downlink component carriers and uplink component carriers in a multi-carrier system to which the present invention is applied.

Referring to FIG. 4, downlink component carriers D1, D2, and D3 are aggregated in downlink, and uplink component carriers U1, U2, and U3 are aggregated in uplink. Here, Di is an index (i=1, 2, 3) of the downlink component carriers, and Ui is an index of uplink component carriers. Among the aggregated DL CCs, one downlink component carrier is a primary component carrier, and the other remaining downlink carriers are secondary component carriers. Similarly, among the aggregated UL CCs, one uplink component carrier is a primary component carrier, and the other remaining uplink carriers are secondary component carriers. For example, D1 and U1 are primary component carriers, and D2, U2, D3, and U3 are secondary component carriers.

In an FDD system, the downlink component carriers and the uplink component carriers are linked in a one-to-one manner, and in this case, D1 is linked to U1, D2 to U2, and D3 to U3, in a one-to-one manner. An MS links the downlink component carriers and the uplink component carriers through system information transmitted by a logical channel BCCH or an MS-dedicated RRC message transmitted by a DCCH. Each linkage may be cell-specific or may be MS-specific (or UE-specific).

In the carrier aggregation, a PDCCH may transmit information regarding allocation of resource of a different carrier, as well as allocation of resource within a carrier to which the pertinent PDCCH corresponds. This is known as cross-carrier scheduling. Through cross-carrier scheduling, control information regarding a secondary component carrier can be transmitted through a primary component carrier. Namely, cross-carrier scheduling is flexible.

Figure 5:
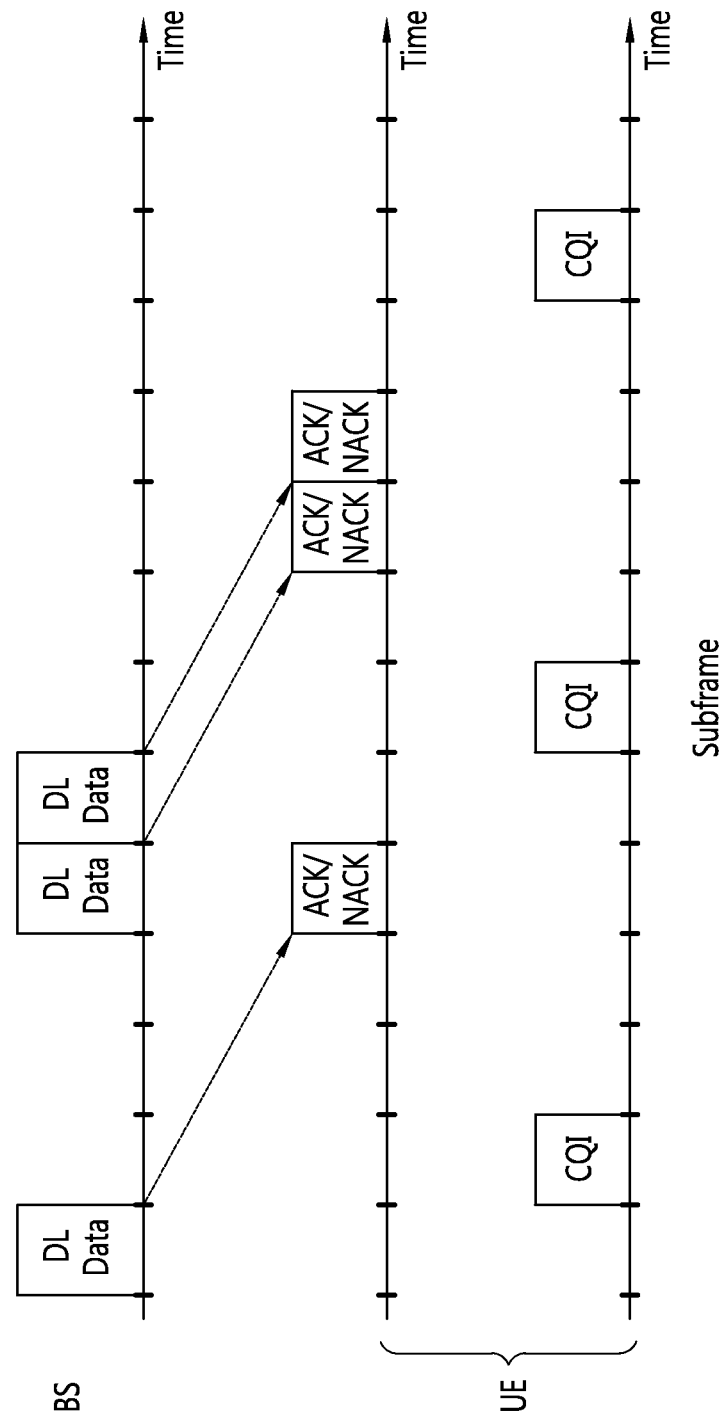
FIG. 5 is a view illustrating downlink HARQ and CQI transmission to which the present invention is applied.

FIG. 5 is a view illustrating downlink HARQ and CQI transmission to which the present invention is applied.

Referring to FIG. 5, when an MS receives downlink data (DL data) from a BS, it transmits an ACK (Acknowledgement)/NACK (Not-Acknowledgement) signal after the lapse of a certain period of time. Downlink data may be transmitted on a PDSCH indicated by a PDCCH. When the downlink data is successfully decoded, the ACK/NACK signal may be an ACK signal, and when decoding of the downlink data fails, the ACK/NACK signal is a NACK signal. When the BS receives the NACK signal, the BS may retransmit the downlink data up to a maximum number of times of retransmission.

A transmission time of the ACK/NACK signal or resource allocation with respect to the downlink data may be dynamically informed by the BS through signaling, or may be previously agreed according to the downlink data transmission time or the resource allocation.

The MS may measure a downlink channel state and periodically and/or aperiodically report a CQI to the BS. The BS may provide a transmission timing of the CQI or resource allocation to the MS.

Figure 6:
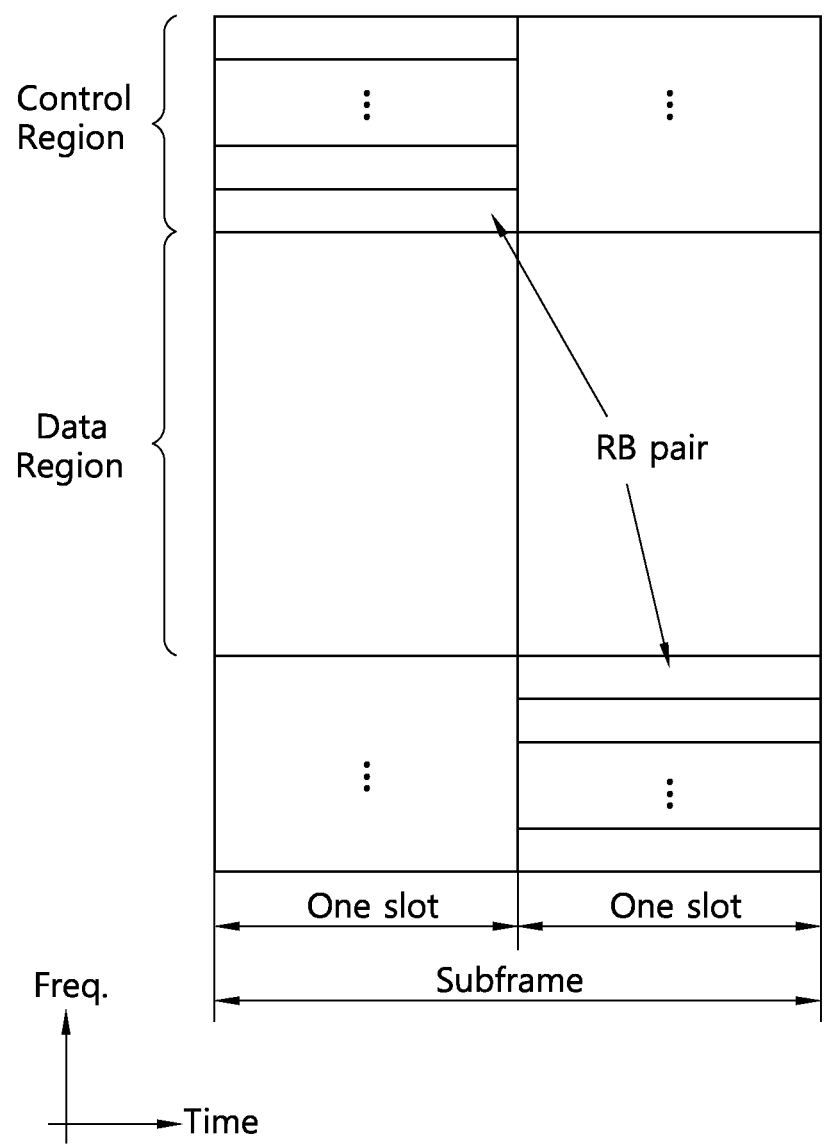
FIG. 6 is a view illustrating an example of a structure of an uplink subframe carrying an ACK/NACK signal to which the present invention is applied.

FIG. 6 is a view illustrating an example of a structure of an uplink subframe carrying an ACK/NACK signal to which the present invention is applied.

Referring to FIG. 6, an uplink subframe may be divided into a control region to which a physical uplink control channel (PUCCH) that carries uplink control information is allocated and a data region to which physical uplink shared channel (PUSCH) that carries user data is allocated in the frequency domain.

In the subframe, a pair of RBs are allocated to the PUCCH with respect to one MS, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. Table 1 below shows modulation schemes and number of bits according to various PUCCH formats.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used.

Control information transmitted on a PUCCH uses a cyclically shifted sequence. The cyclically shifted sequence is obtained by cyclically shifting a base sequence by a particular cyclic shift (CS) amount.

When one resource block includes 12 subcarriers, a sequence having a length of 12 as expressed by Equation 1 shown below is used as a base sequence.

$$r_i(n) = e^{jb(n)\pi/4} \qquad \text{[Equation 1]}$$

Here, $i \in \{0, 1, \ldots, 29\}$ is a root index, n is a component index, $0 \leq n \leq N-1$, and N is a length of the sequence. A different base sequence is defined according to a different root index. In case of N=12, b(n) is defined as shown in Table 2 below.

TABLE 2

| i | b(0), ..., b(11) |
|---|---|
| 0  | -1  1  3 -3  3  3  1  1  3  1 -3  3 |
| 1  |  1  1  3  3  3 -1  1 -3 -3  1 -3  3 |
| 2  |  1  1 -3 -3 -3 -1 -3 -3  1 -3  1 -1 |
| 3  | -1  1  1  1  1 -1 -3 -3  1 -3  3 -1 |
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 | -1  3 -1  1  1 -3 -3 -1 -3 -3  3 -1 |
| 11 |  3  1 -1 -1  3  3 -3  1  3  1  3  3 |
| 12 |  1 -3  1  1 -3  1  1  1 -3 -3 -3  1 |
| 13 |  3  3 -3  3 -3  1  1  3 -1 -3  3  3 |
| 14 | -3  1 -1 -3 -1  3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3.  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1 -3  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

Thus, the base sequence r(n,a) may be cyclically shifted as expressed by Equation 2.

$$r(n,a) = r((n|a) \bmod N), \text{ for } n=0, \ldots, N-1 \quad \text{[Equation 2]}$$

Here, 'a' is the cyclic shift amount, and 'mod' is a modulo operation.

Figure 7:
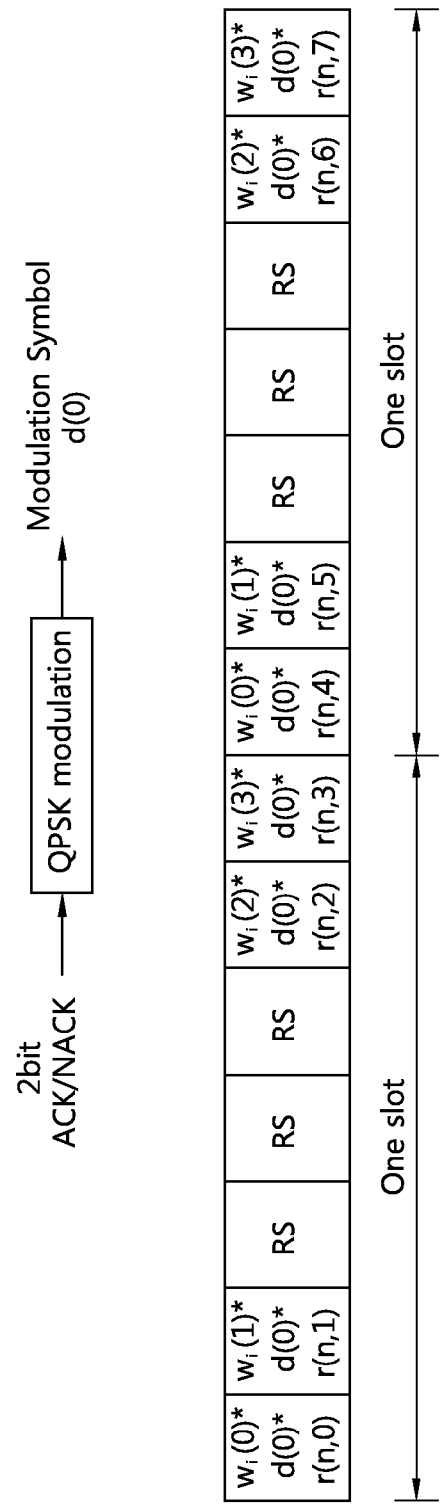
FIG. 7 is a view illustrating an example of transmitting an ACK/NACK signal by using a PUCCH format 1.

FIG. 7 is a view illustrating an example of transmitting an ACK/NACK signal by using a PUCCH format 1.

Referring to FIG. 7, reference signals (RSs) are carried in three SC-FDMA symbols among seven SC-FDMA symbols included in one slot, and ACK/NACK signals are carried in the other remaining four SC-FDMA symbols. The RSs are carried in three contiguous SC-FDMA symbols in the middle of the slot.

In order to transmit the ACK/NACK signal, 2-bit ACK/NACK signal is QPSK (Quadrature Phase Shift Keying)-modulated to generate one modulation symbol d(0). Based on the modulation symbol d(0) and the cyclically shifted sequence r(n,a), a modulated sequence y(n) is generated. The following modulated sequence y(n) may be generated by multiplying a modulation symbol to the cyclically shifted sequence r(n,a).

$$y(n) = d(0)r(n,a) \quad \text{[Equation 3]}$$

The CS amount of the cyclically shifted sequence r(n,a) may be different or the same in each SC-FDMA symbol. Here, 0. 1, 2, and 3 are sequentially placed in the CS amount a in the four SC-FDMA symbols in one slot, but it is merely illustrative.

Here, generation of one modulation symbol by QPSK modulating the 2-bit ACK/NACK signal is illustrated, but one modulation symbol may be generated by BPSK (Binary Phase Shift Keying)-modulating 1-bit ACK/NACK signal. The number of bits of the ACK/NACK signal, a modulation scheme, the number of modulation symbols are merely illustrative and do not limit a technical concept of the present invention.

Also, in order to increase terminal capacity, the modulated sequence may be spread by using an orthogonal sequence (OS). As an orthogonal sequence $w_i(k)$ (i is a sequence index $0 \leq k \leq K-1$) having a spreading factor K=4, the following sequences may be used.

TABLE 3

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Alternatively, as an orthogonal sequence $w_i(k)$ (I is a sequence index, $0 \leq k \leq K-1$) having a spreading coefficient K=3, the following sequences may be used.

TABLE 4

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Here, it is shown that a sequence modulated through the orthogonal sequence $w_i(k)$ having the spreading coefficient K=4 with respect to four SC-FDMA symbols in one slot for the ACK/NACK signal is spread.

The RS may be generated based on a cyclically shifted sequence generated from the same base sequence as that of the ACK/NACK and orthogonal sequence. Namely, the cyclically shifted sequence may be spread through the orthogonal sequence $w_i(k)$ having a spreading coefficient K=3 so as to be used as an RS.

A resource index n(1)PUCCH as resource for transmitting PUCCH formats 1, 1a, and 1b are used to determine a CS amount $\alpha(n_s,l)$ of the base sequence and an orthogonal sequence index $n_{OC}(n_s)$, as well as a position of a physical resource block in which an A/N signal is transmitted. Resource index $n^{(1)}_{PUCCH}$ for the HARQ ACK/NAK signal is obtained as shown in Table 5 below. The resource index $n^{(1)}_{PUCCH}$ is a parameter for determining a physical RB index $n_{PRB}$, the CS amount of the base sequence, the orthogonal sequence index $n_{OC}(n_s)$, and the like.

TABLE 5

| | Dynamic scheduling | Semi-persistent scheduling |
|---|---|---|
| Resource index | $n^{(1)}_{PUCCH} = n_{CCE} + N^{(1)}_{PUCCH}$ | Signaled by using higher layer signaling and control channel |
| Higher layer signaling value | $N^{(1)}_{PUCCH}$ | $n^{(1)}_{PUCCH}$ |

Referring to Table 5, the HARQ ACK/NACK signal with respect to the PDSCH transmitted in the nth subframe is transmitted in the (n+4)th subframe by using the resource index $n^{(1)}_{PUCCH}$ as the sum of a first CCE (control channel element) index $n_{CCE}$ of the PDCCH transmitted in the nth subframe and the value $N^{(1)}_{PUCCH}$ obtained through higher layer signaling or a control channel. $N^{(1)}_{PUCCH}$ is a total number of PUCCH formats 1/1a/1b resources required for semi-persistent scheduling (SPS) transmission and a service request (SR) transmission. In case of the SPS transmission and the SR transmission, since a PDCCH indicating a corresponding PDSCH transmission does not exist, the BS explicitly informs the MS about $n^{(1)}_{PUCCH}$.

The HARQ ACK/NACK signal and/or SR are transmitted through the PUCCH formats 1, 1a, and 1b, physical RB index $n_{PRB}$ is determined by the resource index $n^{(1)}_{PUCCH}$. This is as shown in Equation 4 below.

$$m = \begin{cases} N_{RB}^{(2)} & \text{if } n_{PUCCH}^{(1)} < c \cdot N_{cs}^{(1)}/\Delta_{shift}^{PUCCH} \\ \left\lfloor \dfrac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \end{cases}$$ [Equation 4]

$$c = \begin{cases} 3 & \text{normal cyclic prefix} \\ 2 & \text{extended cyclic prefix} \end{cases}$$

$$n_{PRB} = \begin{cases} \left\lfloor \dfrac{m}{2} \right\rfloor & \text{if } (m + n_s \bmod 2) \bmod 2 = 0 \\ N_{RB}^{UL} - 1 - \left\lfloor \dfrac{m}{2} \right\rfloor & \text{if } (m + n_s \bmod 2) \bmod 2 = 1 \end{cases}$$

Figure 8:
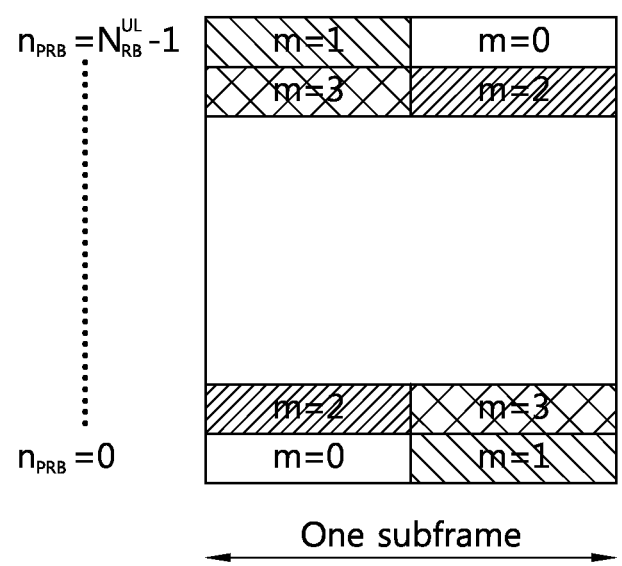
FIG. 8 is a view illustrating an example of mapping PUCCH format 1 to physical RBs.

FIG. 8 is a view illustrating an example of mapping PUCCH format 1 to physical RBs.

Referring to FIG. 8, a physical RB index $n_{PRB}$ is determined according to a resource index $n^{(1)}_{PUCCH}$, and a PUCCH corresponding to each m is frequency-hopped by slots.

In a carrier aggregation environment, an HARQ ACK/NACK signal with respect to multiple downlink component carriers may be transmitted through a single uplink component carrier. Here, 1-bit ACK/NACK signal per codeword (CW) is transmitted.

An HARQ ACK/NACK signal with respect to downlink is transmitted on a PUCCH. A PUCCH format used to transmit the HARQ ACK/NACK signal with respect to downlink includes formats 1a and 1b. The PUCCH format 1b using channel selection may transmit 2 to 4-bit ACK/NACK signal.

In channel selection, HARQ ACK/NACK resource with respect to downlink is allocated by using a table in which a message to be transmitted and resource and modulation symbols to be used for transmission of the corresponding message are mapped. The channel selection table may include a combination of a plurality of resource indices and modulation symbols of an ACK/NACK signal, and may be configured in consideration of the number (M) of bits used to transmit the ACK/NACK signal. Resource required for transmitting a maximum 4-bit signal can be allocated through channel selection. Thus, with respect to an ACK/NACK signal having less than 4 bits, a table may be configured according to a value of the number (M) of bits required for transmitting the ACK/NACK signal, and ACK/NACK resource may be allocated by using the table.

A format of the table used for channel selection may be transmitted to an MS and a BS in advance through higher layer signaling. The MS may obtain an ACK/NACK resource index for configuring a table used for channel selection through separate signaling from a received PDCCH or a higher channel, through a transport channel, or the like.

In order to transmit an ACK/NACK signal, the BS may allocate ACK/NACK resource index implicitly. Implicitly allocating an ACK/NACK resource index implicitly by a BS refers to allocating a resource index calculated by using $n_{CCE}$, which signifies a number of a CCE among at least one CCE constituting a PDCCH of CC#a, as a parameter. The BS may also allocate a resource index explicitly. Explicitly allocating a resource index by a BS refers to allocating a resource index of a PUCCH dedicated to a particular terminal, to a terminal from the BS through a resource allocation indicator, or the like.

Figure 9:
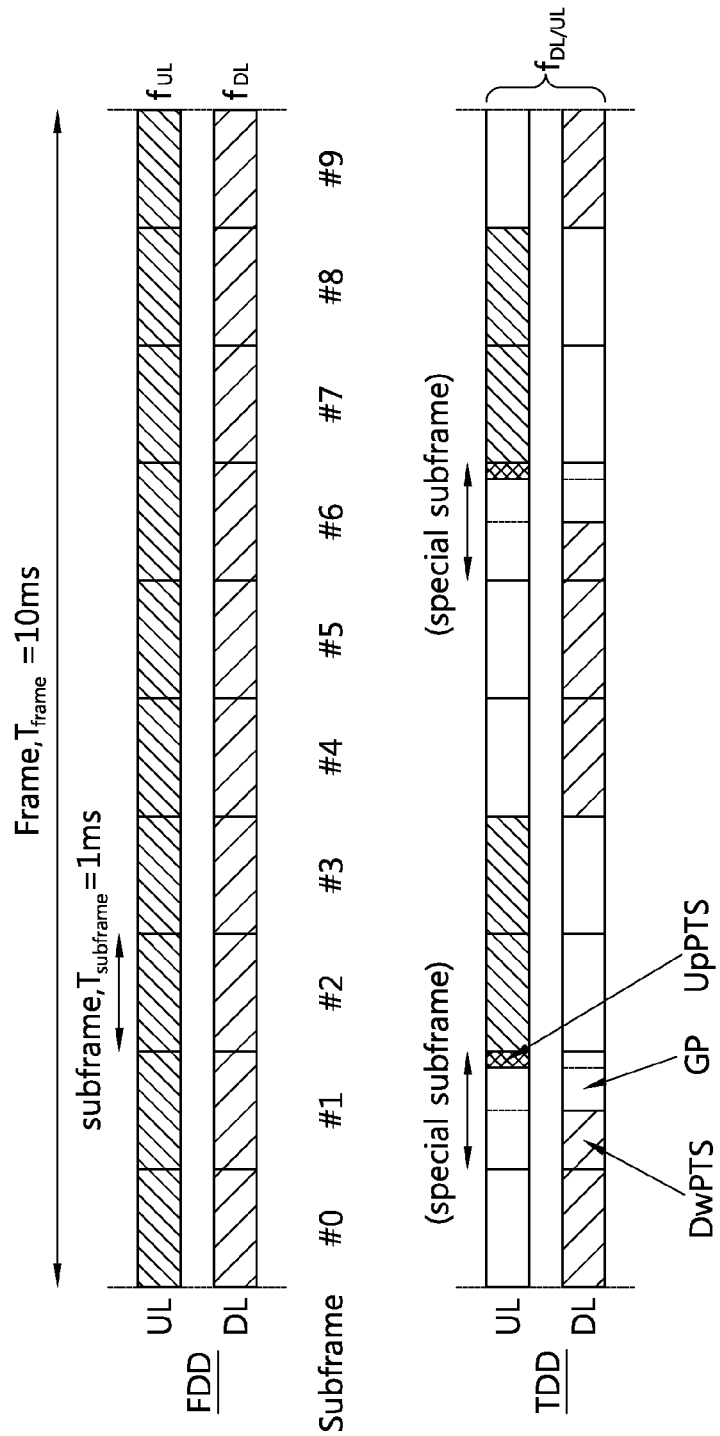
FIG. 9 is a view schematically illustrating a time and frequency structure of uplink and downlink in FDD and TDD modes to which the present invention is applied.

FIG. 9 is a view schematically illustrating a time and frequency structure of uplink and downlink in FDD and TDD modes to which the present invention is applied.

Referring to FIG. 9, in case of FDD, a carrier frequency used for uplink transmission and a carrier frequency used for downlink transmission exist, respectively, so uplink transmission and downlink transmission may be simultaneously performed within a cell.

In case of TDD, uplink transmission and downlink transmission are temporally discriminated on the basis of a single cell. Since the same carrier is used for uplink transmission and downlink transmission, a BS and an MS repeat conversion between a transmission mode and a reception mode. In case of the TDD, a special subframe is provided to provide a guard time for mode conversion between transmission and reception. As illustrated, a special subframe may include a downlink part (DwPTS), a guard period (GP), and an uplink part (UpPTS). During the to guard period, uplink transmission and downlink transmission are not performed.

Table 6 shows uplink and downlink configuration in the TDD mode.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 6, a BS and an MS performs uplink and downlink transmission through seven available downlink/uplink frame configurations. In a frame structure including ten subframes, 'D' denotes a downlink subframe, 'U' denotes an uplink subframe, and 'S' denotes a special subframe.

Through downlink/uplink configuration, transmission resource may be allocated asymmetrically for uplink transmission and downlink transmission. Also, configuration of downlink/uplink frames used between a BS and an MS is not dynamically changed. For example, a BS and an MS, which perform downlink and uplink transmission through configuration 3, do not perform downlink and uplink transmission by using configuration 4 by the frame. However, a configuration may be changed into RRC, or the like, according to a change in a network environment or a system.

Meanwhile, in the case of FDD, an MS transmits HARQ ACK/NACK with respect to PDSCH(s), which have been received in a subframe n−4, in a subframe n.

In the case of TDD, the MS transmits HARQ ACK/NACK with respect to PDSCH(s), which have been received in subframe(s) n−k, in the uplink subframe n. In this case, k is an element of K and K may be defined by Table 7 shown below. K may be determined by uplink-downlink (UL-DL) configuration and the subframe n and may include M number of elements of $k_0, k_1, \ldots, k_{M-1}$.

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 7, it can be seen that subframes in which numbers are written are subframes performing uplink transmission in Table 6.

Through Table 7, an association relation between uplink subframes and downlink subframes can be clearly checked. An HARQ ACK/NACK signal with respect to a downlink subframe may be transmitted through an uplink subframe with which the downlink subframe is associated.

Referring to Table 7, when the UL-DL configuration is 0 and n is 2, a k value is 6. Thus, HARQ ACK/NACK with respect to the PDSCH received in subframe 6 of a previous frame is transmitted to uplink in subframe 2 of a subsequent frame. In a case in which UL-DL configuration is 4 and n is 3, K is 6, 5, 4, and 7. Thus, HARQ ACK/NACK with respect to PDSCH received in subframes 7, 8, 9 and 6 of a previous frame is transmitted to uplink in subframe 3 of a subsequent frame.

Meanwhile, one CW may be transmitted on a single DL CC of each subframe or two CWs may be transmitted. A 1-bit ACK/NACK signal with respect to one CW is transmitted to uplink, and an ACK/NACK signal having a maximum of 4 bits may be transmitted through channel selection using PUCCH format 1b used for ACK/NACK signal transmission. However, in a case in which there is a component carrier transmitting data by 2CW per subframe to downlink, it may be difficult to transmit an ACK/NACK signal according to the PUCCH formats 1a and 1b.

In this connection, in addition to the PUCCH formats stated in Table 1, a PUCCH format 3 may be used. The PUCCH format 3 is a PUCCH format employing DFT-S-OFDM (Discrete Fourier Transform-Spreading-Orthogonal Frequency-Division Multiplexing), which uses DFT-IFFT and block-spreading. When an HARQ ACK/NACK signal is transmitted by using the PUCCH format 3, information having a maximum of 10 bits in case of FDD and information having a maximum of 20 bits in case of TDD can be transmitted by an HARQ ACK/NACK signal through single ACK/NACK resource.

Figure 10:
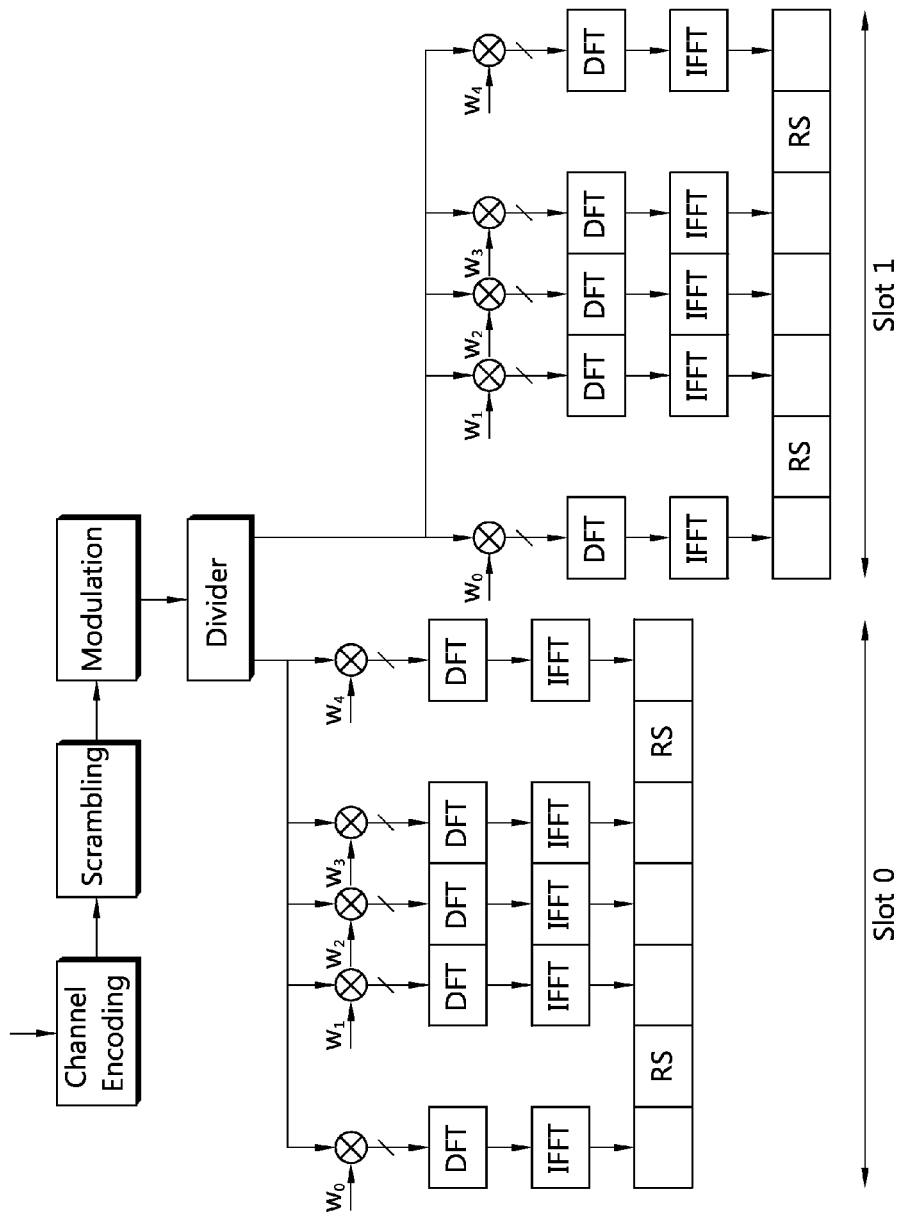
FIG. 10 is a view schematically illustrating an example of PUCCH format 3 in case of a normal CP to which the present invention is applied.

FIG. 10 is a view schematically illustrating an example of PUCCH format 3 in case of a normal CP to which the present invention is applied. In a normal CP, in case of the PUCCH format 3, one slot includes seven OFDM symbols, and here, two OFDM symbols are RS OFDM symbols for a reference signal and five OFDM symbols are data OFDM symbols for an uplink control signal, e.g., an ACK/NACK signal. Here, the number of the RS OFDM symbols and the data OFDM symbols is merely illustrative.

Channel coding is performed on information bits of an ACK/NACK signal to be transmitted by a carrier. Various types of channel coding may be applied. For example, any one of simple repetition, simplex coding, RM (Reed-Muller) coding, punctured RM coding, TBCC (Tail-Biting Convolutional Coding), LDPC (Low Density Parity Check) coding, turbo coding, and the like, may be used. A coding information bit generated according to channel coding results may be rate-matched in consideration of resource mapped to a modulation symbol order to be applied.

Cell-specific scrambling using a scrambling code corresponding to a cell ID or an MS-specific scrambling using a scrambling code corresponding to an MS ID such as RNTI (Radio Network Temporary Identifier) may be applied to the coding information bit generated according to the channel coding results in consideration of inter-cell interference (ICI).

Thereafter, the coding information bit is modulated through a modulator. The coding information bit may be modulated to generate QPSK symbols. The modulated symbols are distributed to first and second slots by a divider. The modulated symbols may be distributed according to various methods. Order of the modulator and the divider may be changed.

The modulated symbols are time-spread through an orthogonal code of an index m determined through RRC (Radio Resource Control) signaling, or the like. When a spreading factor (SF) is 5, the orthogonal code having the index m may be expressed by wm=[w0, w1, w2, w3, w4] as illustrated in FIG. 10. As the orthogonal code, a Walsh code, a DFT code, or any other orthogonal code may be used. Here, the spreading factor refers to a factor by which data is spread, and it may differ according to a system. A spreading factor may be related to the amount of multiplexed terminals or antennas, and an index may be changed in a slot level so as to be applied.

The spread modulation symbols are DFT (Discrete Fourier Transform)-precoded, carried in a subcarrier within a PRB (Physical Resource Block), and subsequently converted into a signal of a time domain through IFFT (Inverse Fast Fourier Transform), and after a CP is added thereto, the signal is transmitted. Here, an implementation example of the PUCCH format 3 is described, but the PUCCH format 3 may be variously implemented and the present invention is not limited to the particular implementation example of the PUCCH format 3.

In the system supporting carrier aggregation, methods using the PUCCH format 3 may be variously considered.

However, even in this case, it may be difficult to multiplex entire ACK/NACK signals and transmit them according to whether each component carrier per downlink subframe transmits data by 1CW each time or 2CW each time in a downlink transmission mode.

Table 8 schematically shows the amount of bits required for multiplexing ACK/NACK signals and transmitting the same in a case in which each downlink component carrier transmits data by 2CW each time in a TDD system of a carrier aggregation environment.

TABLE 8

| Amount of CC | Transmission mode | Amount of DL subframes related to UL subframes | Amount of ACK/NACK bits |
|---|---|---|---|
| 2 | 2CW | 2 | 4 + 4 |
|   |     | 3 | 6 + 6 |
|   |     | 4 | 8 + 8 |
|   |     | 9 | 18 + 18 |
| 3 | 2CW | 2 | 4 + 4 + 4 |
|   |     | 3 | 6 + 6 + 6 |
|   |     | 4 | 8 + 8 + 8+ |
|   |     | 9 | 18 + 18 + 18 |
| 4 | 2CW | 2 | 4 + 4 + 4 + 4 |
|   |     | 3 | 6 + 6 + 6 + 6 |
|   |     | 4 | 8 + 8 + 8 + 8 |
|   |     | 9 | 18 + 18 + 18 + 18 |
| 5 | 2CW | 2 | 4 + 4 + 4 + 4 + 4 |
|   |     | 3 | 6 + 6 + 6 + 6 + 6 |
|   |     | 4 | 8 + 8 + 8 + 8 + 8 |
|   |     | 9 | 18 + 18 + 18 + 18 + 18 |

As shown in Table 8, it can be seen that a size of payload for HARQ ACK/NACK signal transmission exceeds 20 bits in many cases. Thus, in this case, although ACK/NACK signals are transmitted in the PUCCH format 3, it is difficult to multiplex the entire signals and transmit the same.

If a size of HARQ ACK/NACK signals intended to be transmitted exceeds a payload size, the ACK/NACK signals may be transmitted through spatial bundling. For example, ACK/NACK signals with respect to downlink component carriers or downlink subframes to be bundled may be bundled through logical product operation (or an AND operation). Namely, in a case in which HARQ ACK/NACK signals with respect to downlink component carriers or downlink subframes to be bundled are all ACKs, the ACKs may be transmitted by an HARQ ACK/NACK signal representing the bundled ACK/NACK signals. In a case in which HARQ ACK/NACK signals with respect to at least one component carrier or subframe are NACKs, the NACKs may be transmitted by an HARQ ACK/NACK signal representing the bundled ACK/NACK signal. Also, in a case in which HARQ ACK/NACK signals with respect to at least one component carrier or subframe are DTXs, the DTXs may be transmitted by an HARQ ACK/NACK signal representing the bundled ACK/NACK signals.

A BS checks the representative value with respect to the bundled ACK/NACK signals, and determines whether to re-transmit corresponding data. For example, in a case in which bundled ACK/NACK signals are ACKs, it is determined that an MS has received all the corresponding signals and successfully decoded them, and the BS does not re-transmit data. For example, in a case in which bundled ACK/NACK signals are NACKs or DTXs, the BS may re-transmit all the corresponding data.

Even in the HARQ ACK/NACK signal transmission using the PUCCH format 3, in a case in which a size of the HARQ ACK/NACK signals to be transmitted exceeds 20 bits, transmission of the HARQ ACK/NACK signals by using spatial bundling may be considered.

In the case of spatial bundling, HARQ ACK/NACK signals with respect to CWs transmitted by a single component carrier in a single subframe may be bundled to a single representative signal.

Hereinafter, a method for spatial-bundling HARQ ACK/NACK signals having 20 bits or greater by using the PUCCH format 3 and transmitting the same will be described. It should be appreciated that the following description is applied to a case in which HARQ ACK/NACK signals having 20 bits or greater by using the PUCCH format 3, unless otherwise mentioned.

1. Spatial Bundling According to MS Selection in PUCCH Format 3

With respect to ACK/NACK signals with respect to a PDCCH transmitted in each component carrier of a downlink subframe associated with an uplink subframe transmitting an HARQ ACK/NACK signal, an MS may bundle HARQ ACK/NACK signals with respect to a CW for each component carrier per subframe. Thus, in a case in which one CW is transmitted, the MS does not perform bundling, and in a case in which two CWs are transmitted, the MS may bundle HARQ ACK/NACK signals with respect to the respective CWs and transmit it as a 1-bit HARQ ACK/NACK signal.

The MS may transmit ACK/NACK signals by using spatial bundling with respect to all the component carriers which have transmitted two CWs among component carriers in a downlink subframe associated with one uplink subframe. In the present disclosure, the spatial bundling in this case will be referred to as 'full bundling'.

Also, with respect to some component carriers which have transmitted two CWs, among component carriers in the downlink subframe associated with the one uplink subframe, the MS may transmit ACK/NACK signals by using spatial bundling. In the present embodiment, the spatial bundling in this case will be referred to as 'partial bundling'.

In the case of the full bundling, the MS may perform spatial bundling according to a scheme previously determined between the MS and the BS.

Also, in the case of partial bundling, the MS may perform spatial bundling according to a scheme previously determined between the MS and the BS. Also, in the case of the partial bundling, the MS may select a scheme of the spatial bundling according to a current channel state, a data reception state, or the like. In this case, which one of spatial bundling schemes is to be selected may be previously determined between the MS and the BS, and information regarding which spatial bundling scheme is to be selected may be transmitted to the MS through higher layer signaling.

Figure 11:
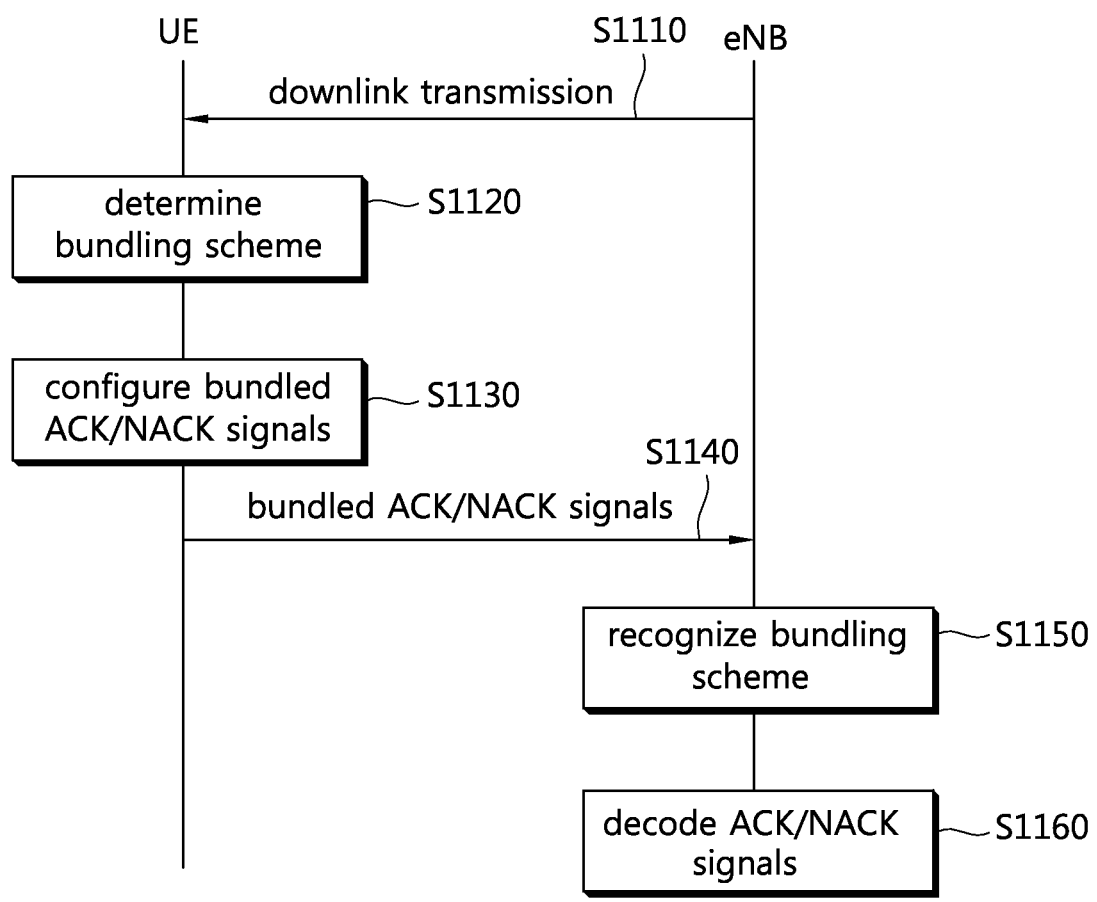
FIG. 11 is a flow chart illustrating a method for transmitting an ACK/NACK signal in PUCCH format 3 by using spatial bundling in a system to which the present invention is applied.

FIG. 11 is a flow chart illustrating a method for transmitting an ACK/NACK signal in the PUCCH format 3 by using spatial bundling in a system to which the present invention is applied.

Referring to FIG. 11, the BS performs downlink transmission to transmit data on a PDSCH (S1110). Upon receiving the downlink data, the MS prepares transmission of an HARQ ACK/NACK signal according to whether the PDSCH has been successfully received.

In order to transmit the HARQ ACK/NACK signal in the PUCCH format 3, the MS determines a required scheme of spatial bundling (S1120). In the case in which the MS uses spatial bundling, the MS determines whether to use a full bundling mode or a partial bundling mode. Which spatial bundling mode is to be used may be previously determined between the BS and the MS or information required for selection may be transmitted to the MS through higher layer signaling.

On the basis of the determined spatial bundling scheme, the MS configures a bundled HARQ ACK/NACK signal (S1130).

In case of selecting the full bundling mode, the MS performs spatial bundling all component carriers which have transmitted two CWs in the downlink subframe associated with the uplink subframe to configure an HARQ ACK/NACK signal.

In case of selecting the partial bundling mode, the MS performs spatial bundling on some of all the component carriers which have transmitted two CWs in the downlink subframe associated with the uplink subframe to configure an HARQ ACK/NACK signal. In this case, the MS may perform partial bundling according to various schemes as described hereinafter. The partial bundling mode performed by the MS may be previously determined with the BS or may be a scheme selected by the MS. In the case in which the MS selects the partial bundling scheme, relevant information may be transmitted to the BS in advance or afterwards, as necessary.

The MS transmits the bundled HARQ ACK/NACK signal to the BS (S1140). The spatial-bundled HARQ ACK/NACK signal, having a payload size equal to or less than 20 bits, may be transmitted in the PUCCH format 3.

The BS recognizes a bundling scheme of the received HARQ ACK/NACK signal (S1150). Here, the bundling scheme may include a scheme of spatial bundling, i.e., whether it is the full bundling mode or the partial bundling mode, and even a performing scheme in case of the partial bundling mode. With respect to a mode of the spatial bundling, the BS may recognize whether the full bundling was performed or whether the partial bundling was performed according to the number of bits of the HARQ ACK/NACK signal. Also, as described hereinafter, in case of the scheme of performing partial bundling, required information may be transmitted from the MS to the BS in advance or afterwards, based on which the BS may recognize a scheme in which the partial bundling was performed.

The BS may decode the HARQ ACK/NACK signal transmitted from the MS on the basis of the recognized spatial bundling scheme (S1160).

Hereinafter, details of the spatial bundling will be described.

<Selection of Full Bundling Mode and Partial Bundling Mode>

In case of transmitting an HARQ ACK/NACK signal by using bundling, even if only one CW is not properly received, the BS should retransmit the entire CWs, a CW, which has been already properly received, may be unnecessarily retransmitted.

Meanwhile, when HARQ ACK/NACK signals are bundled and transmitted, transmission power per bit may be advantageously increased in terms of limited power transmission. Another advantage is that the number of bits used to transmit the HARQ ACK/NACK signals is reduced.

Thus, the MS may more effectively perform HARQ ACK/NACK signal transmission by appropriately selecting the full bundling mode and the partial bundling mode in consideration of a current communication state. For example, in a case in which a channel state is poor because the MS is located in the edge of cell coverage, the MS may use the full bundling mode to increase power used to transmit the HARQ ACK/NACK signal. Also, in a channel environment in which a credible error rate is anticipated in transmission of the HARQ ACK/NACK signal, the MS may seek effective use of transmission resource by using the partial bundling mode.

The MS may estimate a current uplink channel state thereof on the basis of a downlink channel state. Reciprocity to a degree exists between uplink and downlink of the BS and the MS. Thus, the MS may estimate an uplink channel state on the basis of a downlink channel state recognized through CQI (Channel Quality Indicator), RSRP (Reference Signal Received Power), RSRQ (Reference Signal Received Quality), or the like, measured each time, and determine whether to select the full bundling mode or the partial bundling mode.

<Full Bundling Mode>

Figure 12:
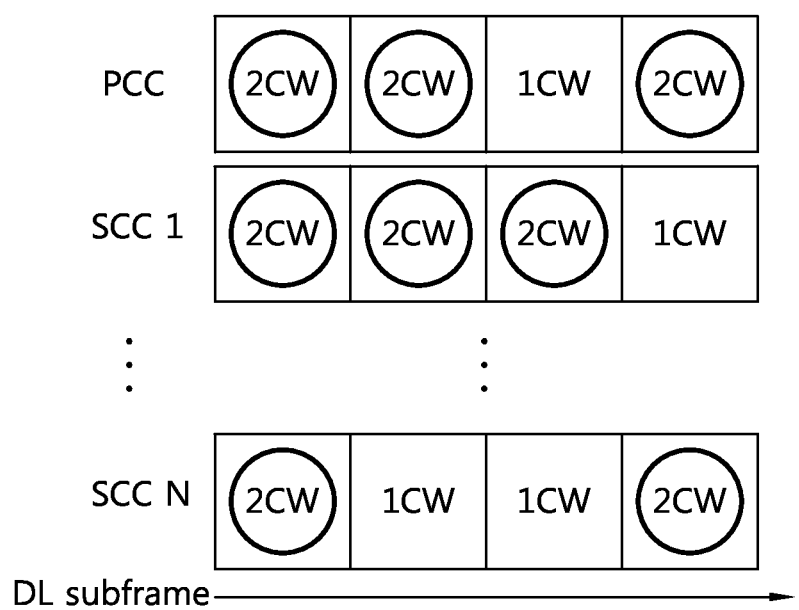
FIG. 12 is a view schematically illustrating an embodiment regarding a method for performing overall bundling in the system to which the present invention is applied.

FIG. 12 is a view schematically illustrating an embodiment regarding a method for performing overall bundling in the system to which the present invention is applied. A case of four downlink subframes associated with a single uplink subframe will be described as an example with reference to FIG. 12.

A plurality of component carriers (CCs) may be transmitted in a single downlink subframe. Among the plurality of CCs, one CC may be a primary component carrier (PCC) and the other remaining CCs may be secondary component carriers (SCCs).

The PCC may be in a constantly activated state, namely, in a scheduled state, and the SCCs may be in a deactivated state, namely, in an unscheduled state. Hereinafter, in the following description of the present disclosure, it is assumed that a CC is an activated CC, unless otherwise mentioned.

Referring to FIG. 12, a CC may transmit one CW (1CW) or two CWs (2CW) in each subframe. In FIG. 12, a circle encircling each 2CW means that HARQ ACK/NACK signals with respect to the corresponding 2CW were spatial-bundled.

In the full bundling mode, the MS performs spatial bundling on all the CCs which have transmitted 2CW in the subframes associated with a single uplink subframe.

In the case of the full bundling, the BS may recognize whether a signal is a spatial-bundled HARQ ACK/NACK signal on the basis of a transmission mode of a CC transmitted to downlink (whether it is 1CW or 2CW).

<Partial Bundling Mode>

In order to transmit HARQ ACK/NACK signals in the PUCCH format 3, the MS may perform partial spatial bundling thereon.

In order to perform spatial bundling on some CCs which have transmitted 2CW in the downlink subframe associated with one uplink subframe, the following partial bundling scheme is in question: (1) where spatial bundling is to start in a CC of a downlink subframe (start point); (2) in what direction spatial bundling is to be performed (performing direction); and (3) where spatial bundling is to be terminated in CCs of a downlink subframe (end point).

Start Point of Spatial Bundling

The MS may perform spatial bundling, starting from a CC exposed to a poor channel environment. In the case of a CC exposed to a poor channel environment, all HARQ ACK/NACK signals with respect to two CWs are highly likely to be NACK. Thus, it may be considered that a possibility that unnecessary retransmission is made through spatial bundling is low.

Also, the MS may perform spatial bundling, starting from a subframe exposed to a poor channel environment. Also, in the case of a subframe exposed to a poor channel environment, all HARQ ACK/NACK signals with respect to two CWs are highly likely to be NACK. Thus, transmission efficiency can be further enhanced through spatial bundling.

Also, the MS may first perform spatial bundling on an SCC. In general, in terms of frequency of scheduling, a PCC tends to be more frequently scheduled than an SCC, so performing spatial bundling first on an SCC which is less frequently scheduled may be considered.

Here, a channel environment and a primary/secondary component carrier have been described as examples of selecting a start point of spatial bundling, but the present invention is not limited thereto and a start point of spatial bundling may be selected according to various other references.

Direction for Performing Spatial Bundling

Spatial bundling may be performed in various directions. Unlike full bundling, in case of partial bundling, a start point of spatial bundling is selected in consideration of a channel state and spatial bundling is performed on CCs in some subframes therefrom, so it is required to determine in which direction from the start point, spatial bundling is to be performed.

FIGS. 13 through 16 are views schematically illustrating examples of various directions in which spatial bundling is performed with respect to component carriers of downlink subframes associated with a single uplink subframe in the system to which the present invention is applied.

Spatial bundling may be performed by same subframes. Namely, spatial bundling may be performed in a frequency axis direction. Also, spatial bundling may be performed by same CCs. Namely, spatial bundling may be performed in a time axis direction.

Figure 13:
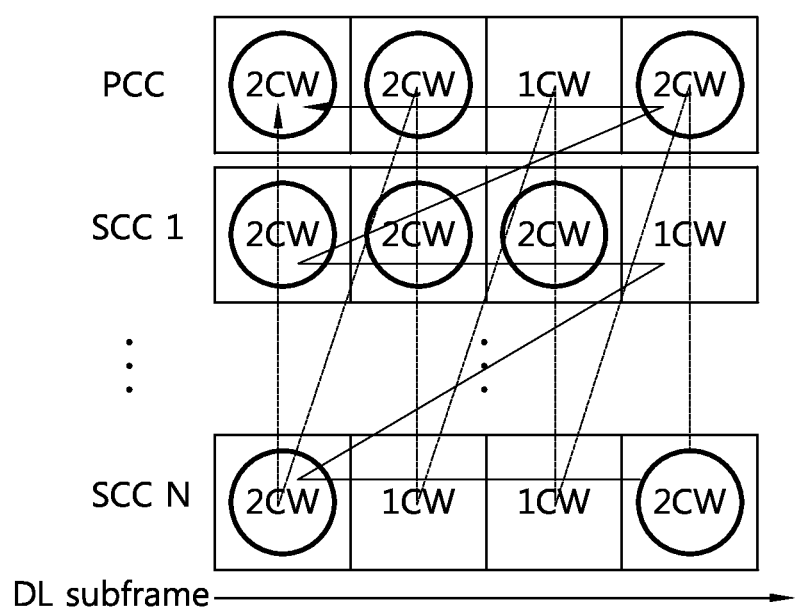
FIGS. 13 through 16 are views schematically illustrating examples of various directions in which spatial bundling is performed with respect to component carriers of downlink subframes associated with a single uplink subframe in the system to which the present invention is applied.
Figure 14:
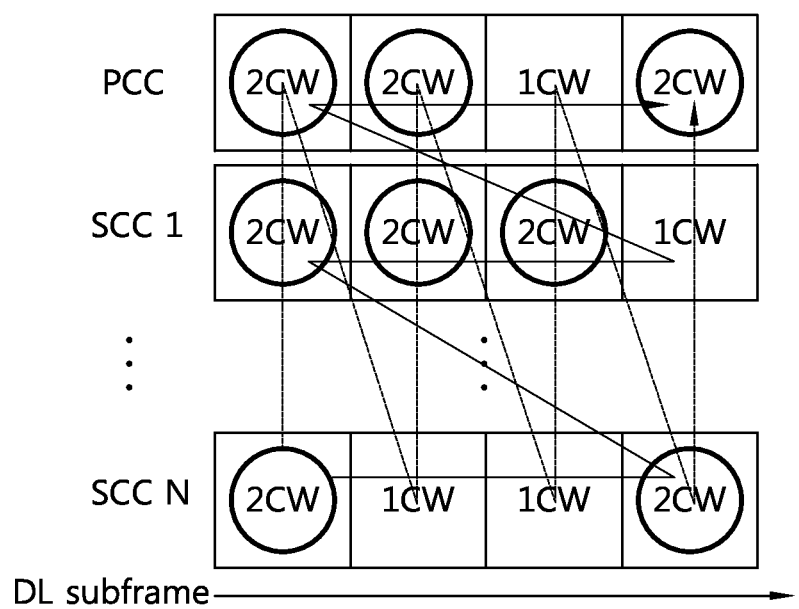
Figure 15:
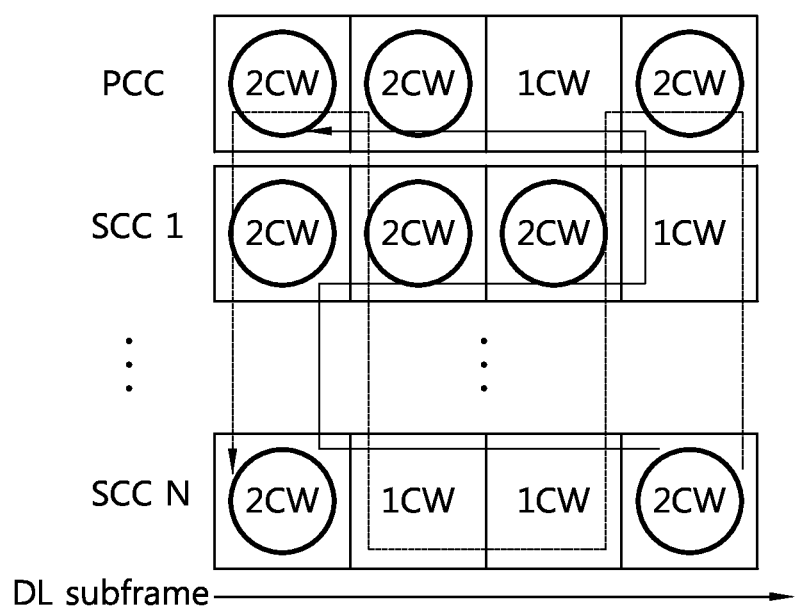
Figure 16:
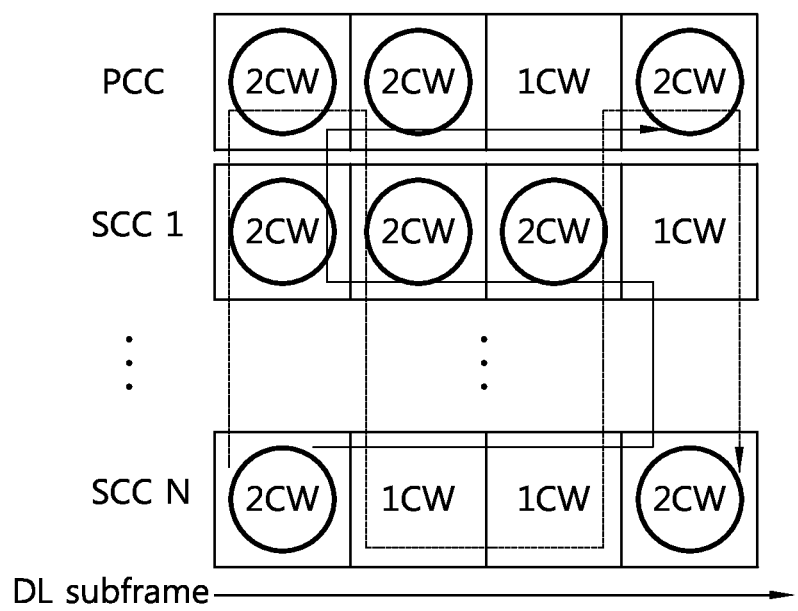

FIGS. 13 and 15 illustrate performing of spatial bundling, starting from the last detected CC. FIGS. 14 and 16 illustrate performing of spatial bundling, starting from the first detected CC. In FIGS. 13 to 16, the solid lines indicate directions in which spatial bundling is performed along a time axis in the same CC, and the dotted lines indicate directions in which to spatial bundling is performed along a frequency axis in the same subframe. Detecting a CC refers to receiving or decoding data of a CC.

A direction in which spatial bundling is performed is related to order of ACK/NACK signals of CCs in the downlink subframe among the entire bundled HARQ ACK/NACK signals. Thus, the BS may check whether data, which was transmitted by CCs in the downlink subframe, has been received according to the performing direction of spatial bundling.

The performing direction of spatial bundling may be determined in advance between the MS and the BS or may be transmitted to the MS through higher layer signaling.

Also, the performing direction of spatial bundling may be determined by the MS. For example, in a case in which spatial bundling starts to be performed first on a CC exposed to the poorest channel environment in consideration of a channel environment, when spatial bundling on the CC is completed, the MS may move to a CC exposed to the second-poorest channel environment and perform spatial bundling thereon. In this case, information required by the BS regarding a performing direction of spatial bundling may be transmitted from the MS to the BS. For example, in a case in which performing spatial bundling, starting from the CC exposed to the poorest channel environment to the CC exposed to the second-poorest channel environment, is determined in advance between the MS and the BS or when it is transmitted to the MS through higher layer signaling, the MS may determine a performing direction of spatial bundling on the basis of a channel state. In this case, the BS may obtain relevant information implicitly from the MS as described hereinafter.

Here, a performing direction of spatial bundling as illustrated in FIGS. 13 through 16 is described as an example of a scheme to which the present invention is applied, but the present invention is not limited thereto and spatial bundling may be performed in various directions.

End Point of Spatial Bundling

An MS may perform spatial bundling until when payload of the entire HARQ ACK/NACK signals to be transmitted in a single uplink subframe has a predetermined size. Namely, a target of the special bundling of the MS is the CC that transmits 2CW. Thus, while spatial bundling is being performed to bundle HARQ ACK/NACK signals with respect to the CC that transmits 2CW into a 1-bit representative signal, when the entire payload size of the HARQ ACK/NACK signals with respect to the spatial-bundled CC and HARQ ACK/NACK signals with respect to a CC which has not been spatial-bundled (i.e., a CC that transmits 1CW and a CC which has not spatial-bundled yet but transmits 2CW) is equal to or less than a predetermined size, the MS stops spatial bundling. For example, in the present embodiment in which HARQ ACK/NACK signals are transmitted by using the PUCCH format 3, when the payload size of the entire HARQ ACK/NACK signals is equal to or less than 20 bits, spatial bundling may be terminated. When spatial bundling is terminated, the MS may multiplex the spatial-bundled HARQ ACK/NACK signals and the HARQ ACK/NACK signals which have not been spatial-bundled to configure the entire HARQ ACK/NACK signals.

An end point of spatial bundling may be determined in advance between the MS and the BS, or may be transmitted to the MS through higher layer signaling.

Also, when to terminate spatial bundling may be determined in relation to a magnitude of the HARQ ACK/NACK signals to be transmitted by the MS. Thus, as mentioned above, in a poor channel environment, an end point of spatial bundling may be changed in order to enhance transmission power per transmission bit.

Transmission of Information Regarding Determination Reference and Scheme with Respect to Partial Bundling Scheme As mentioned above, the determination reference regarding a scheme of partial bundling regarding a start point, a performing direction, an end point, and the like, of spatial bundling may be determined in advance between the MS and the BS. Also, the determination reference regarding the scheme of partial bundling may be transmitted to the MS through higher layer signaling.

Also, the MS may transmit a reference for determining a scheme of partial bundling to the BS implicitly, and a scheme of partial bundling may be dynamically selected according to the reference. For example, the MS may select a scheme of partial bundling according to a channel environment. In detail, the MS may perform spatial bundling, starting from a CC exposed to a channel environment or a subframe exposed to a poor channel environment. Here, CC/subframe exposed to a poor channel environment may be selectively changed according to time/frequency, so the MS may select a start point of spatial bundling each time dynamically.

In the case in which the MS determines a scheme of partial bundling dynamically to according to a channel environment, CQI information or RSRP (Reference Signal Received Power)/RSRQ (Reference Signal Received Quality) information of each CC may be used as a reference for determining a channel environment.

A CQI (Channel Quality Indicator) is information regarding a channel measurement value the MS measures and periodically reports to the BS with respect to an activated CC (scheduled CC). Through a downlink CQI, channel quality of currently scheduled CCs may be determined. RSRP and RSRQ are values the MS reports to the BS when a particular event occurs. Unlike CQI, the RSRP and RSRQ are information regarding channel quality measurable even for a deactivated CC (unscheduled CC), which may be a basis for determining link quality of a corresponding CC at a point in time at which a deactivated CC is activated.

The MS may determine from which CC spatial bundling is to be performed on the basis of channel quality of CCs determined through downlink CQI. The MS may also determine from which CC spatial bundling is to be performed on the basis of channel quality of CCs determined through downlink RSRP or RSRQ. Also, in consideration of the fact that a CQI is periodically reported to the BS but it cannot be obtained at an initial stage and that RSRP and RSRQ are measurement values that can be obtained at an initial stage but they are reported to the BS when a particular event occurs, the MS may determine a scheme of spatial bundling on the basis of the CQI, and here, in a case in which a first activated CC is to be considered, the MS may determine a scheme of spatial bundling on the basis of the RSRP or the RSRQ. In this case, if a first activated CC does not exist, the MS may be converted into a mode based on the CQI, and when there is a first activated CC, the MS may be converted into a mode based on the RSRP or the RSRQ.

When the MS uses the CQI or the RSRP/RSRQ as a reference for dynamically determining a scheme of partial bundling, the MS may transmit information regarding the determined scheme of partial bundling to the BS implicitly. The CQI is a measurement value the MS periodically reports to the BS, and the RSRP and RSRQ are also measurement values the MS reports to the BS when a particular event occurs. Thus, in a case in which the use of the CQI or the RSRP/RSRQ as a reference for dynamically determining a scheme of partial bundling is determined in advance between the MS and the BS or in a case in which an instruction to use the CQI or the RSRP and the RSRQ as a reference for dynamically determining a scheme of partial bundling is transmitted to the MS through higher layer signaling, the BS may be able to recognize from which CC spatial bundling was performed, on the basis of the CQI or the RSRP and RSRQ of each CC reported from the MS with respect to the entire bundled HARQ ACK/NACK signals.

Here, the case in which the scheme of partial bundling is determined in advance between the MS and the BS or is transmitted to the MS through higher layer signaling and the case in which the MS dynamically determines a scheme of partial bundling have been described, but some conditions of the scheme of partial bundling may be dynamically determined by the MS while the other remaining conditions may be determined in advance between the MS and the BS or may be transmitted to the MS through higher layer signaling. For example, a start point of spatial bundling may be dynamically determined by the MS, while a performing direction of spatial bundling may be determined in advance between the MS and the BS or may be transmitted to the MS through higher layer signaling.

Also, here, partial bundling is performed according to a channel state, e.g., on the basis of the CQI or the RSRP and RSRQ, but if a channel state is worse than a predetermined reference value (or threshold) according to channel state measurement results, full bundling, rather than partial bundling, as described above may be performed.

Hereinafter, specific embodiments of partial bundling will be described with reference to the accompanying drawings. For the description purpose, the same content as that described above in the former embodiments will be omitted in the following embodiments.

Scheme of Performing Spatial Bundling Along Time Axis

Performing spatial bundling along a time axis may be determined in advance between the MS and the BS or a corresponding instruction may be transmitted to the MS through higher layer signaling.

Figure 17:
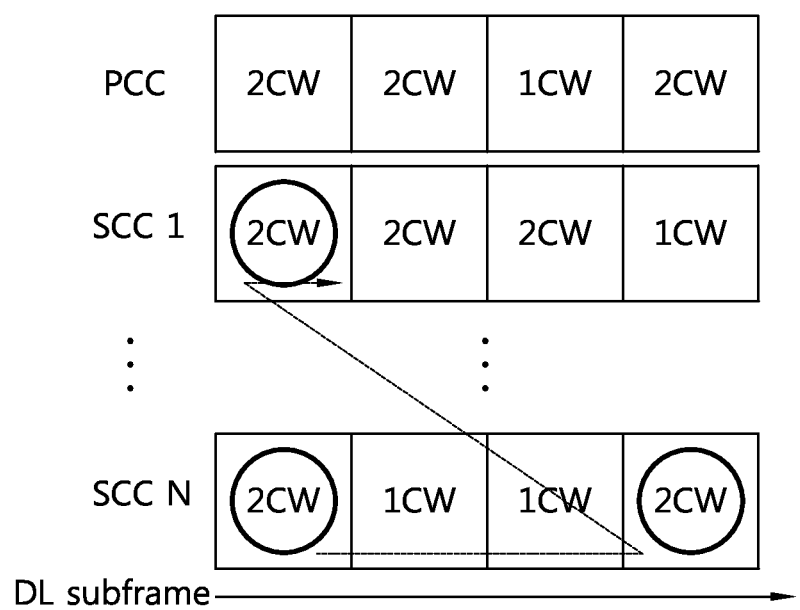
FIG. 17 is a view schematically illustrating performing of spatial bundling, starting from a secondary component carrier of the first detected subframe, in a time axis.

FIG. 17 is a view schematically illustrating performing of spatial bundling, starting from a secondary component carrier of the first detected subframe, in a time axis.

Starting spatial bundling from a secondary component carrier (SCC) of the first detected subframe may be determined in advance between the MS and the BS or a corresponding instruction may be transmitted to the MS through higher layer signaling. Also, it may be determined that the MS checks a channel state and performs spatial bundling, starting from a corresponding SCC. In this case, performing spatial bundling in the first detected subframe may be determined in advance between the BS and the MS or a corresponding instruction may be transmitted to the MS through higher layer signaling.

Referring to FIG. 17, spatial bundling is performed, starting from an SCC in the first detected subframe, along a time axis. Spatial bundling is not performed on a subframe that transmits 1CW but performed on a subframe that transmits 2CW. When spatial bundling performed on a corresponding CC is terminated, spatial bundling may be performed, starting from the first detected subframe of a next CC, along the time axis. Spatial bundling is performed until when a size of payload of the entire HARQ ACK/NACK signals to be transmitted reaches a predetermined bit number. For example, in a case in which spatial bundling is performed until when a size of payload of HARQ ACK/NACK signals reaches 20 bits, when a size of payload of the entire HARQ ACK/NACK signals has reached 20 bits according to the spatial bundling results with respect to the first detected subframe of SCC 1, the MS terminates the spatial bundling. The MS may transmit a spatial-bundled HARQ ACK/NACK signal and an HARQ ACK/NACK signal which has not been spatial-bundled, in the PUCCH format 3.

Order of CCs on which spatial bundling is to be performed and a predetermined number of bits as a reference for performing spatial bundling may be determined in advance between the MS and the BS or may be transmitted to the MS through higher layer signaling.

Figure 18:
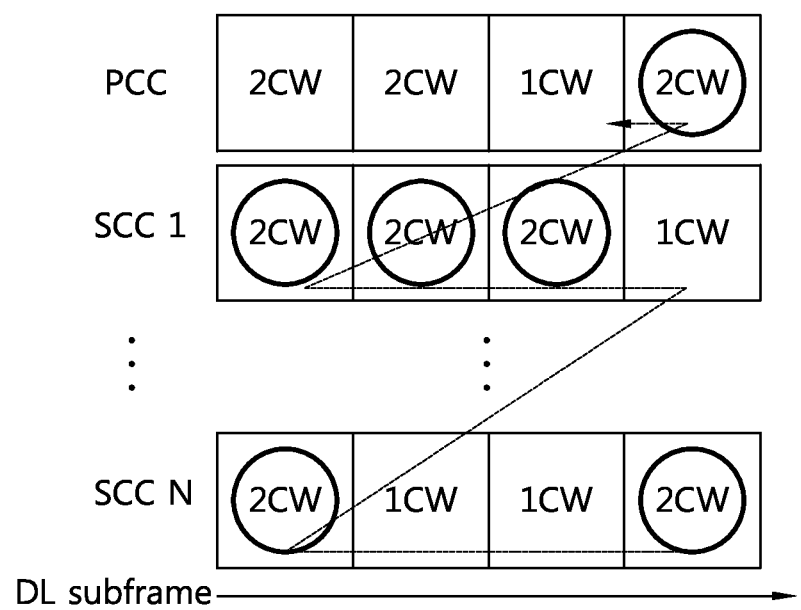
FIG. 18 is a view schematically illustrating performing of spatial bundling, starting from a secondary component carrier of the last detected subframe, in a time axis.

FIG. 18 is a view schematically illustrating performing of spatial bundling, starting from a secondary component carrier of the last detected subframe, in a time axis.

In comparison to the example of FIG. 17, FIG. 18 illustrates a case in which spatial bundling starts from an SCC of the last detected subframe. A start point, a performing direction, and/or an end point of spatial bundling may be determined in advance between the MS and the BS or may be transmitted to the MS through higher layer signaling. Or, the MS may check a channel state and determine them. Some conditions regarding a start point, a performing direction, and/or an end point of spatial bundling may be determined by the MS, while the other remaining conditions may be determined in advance between the BS and the MS or may be transmitted to the MS through higher layer signaling.

In the case of FIGS. 17 and 18, spatial bundling is performed until when the conditions for terminating spatial bundling are met. Thus, even when spatial bundling on SCCs is completed, if a size of payload of the entire HARQ ACK/NACK signals is greater than a predetermined size, e.g., 20 bits, even a primary component carrier (PCC) may be subjected to spatial bundling, of course.

Figure 19:
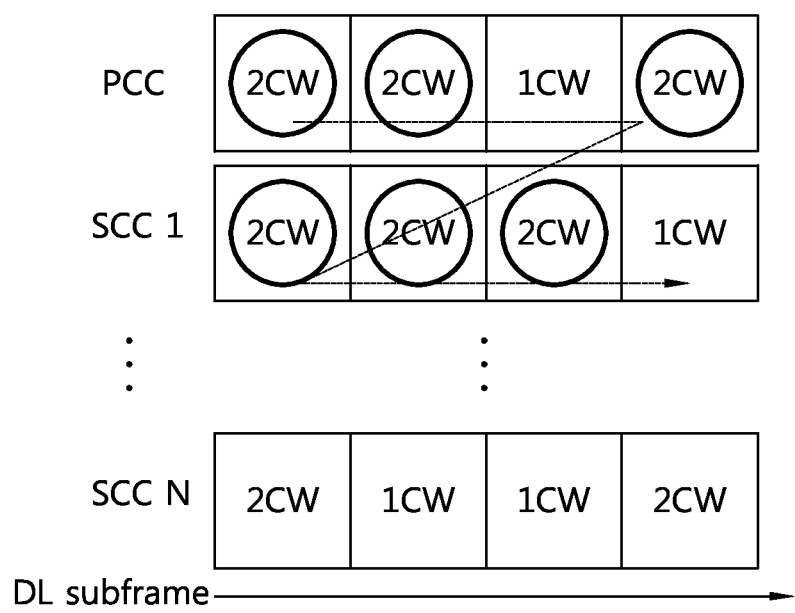
FIG. 19 is a view schematically illustrating performing of spatial bundling, starting from a primary component carrier of the first detected subframe, in a time axis.
Figure 20:
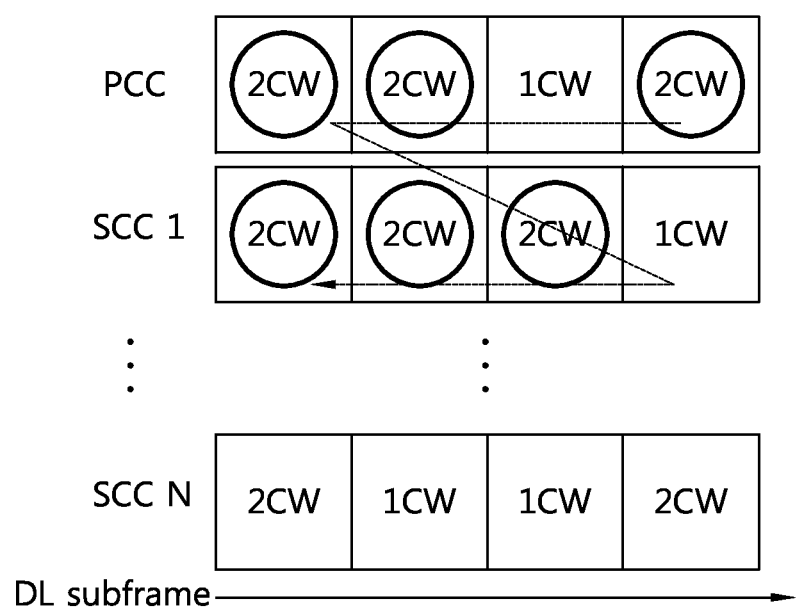
FIG. 20 is a view schematically illustrating performing of spatial bundling, starting from a primary component carrier of the last detected subframe, in a time axis.

FIG. 19 is a view schematically illustrating performing of spatial bundling, starting from a primary component carrier of the first detected subframe, in a time axis. FIG. 20 is a view schematically illustrating performing of spatial bundling, starting from a primary component carrier of the last detected subframe, in a time axis.

Referring to FIGS. 19 and 20, spatial bundling starts from a PCC and is continued to an SCC. Spatial bundling may be performed until when a predetermined termination condition is met, for example, until when a size of payload of the entire HARQ ACK/NACK signals reaches a value less than a predetermined size.

A start point, a performing direction, and/or an end point of spatial bundling may be determined in advance between the MS and the BS or may be transmitted to the MS through higher layer signaling. Or, the MS may check a channel state and determine them. Some conditions regarding a start point, a performing direction, and/or an end point of spatial bundling may be determined by the MS, while the other remaining conditions may be determined in advance between the BS and the MS or may be transmitted to the MS through higher layer signaling. Relevant information may be transmitted to the BS implicitly.

Scheme of Performing Spatial Bundling Along Frequency Axis

Performing spatial bundling along a frequency axis may be determined in advance between the MS and the BS or a corresponding instruction may be transmitted to the MS through higher layer signaling.

Figure 21:
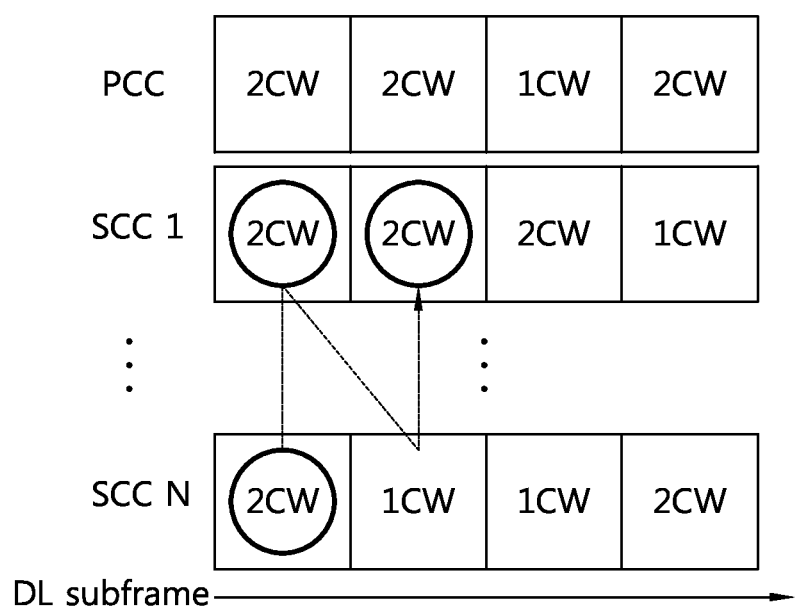
FIG. 21 is a view schematically illustrating performing of spatial bundling, starting from a secondary component carrier of the first detected subframe, in a frequency axis.

FIG. 21 is a view schematically illustrating performing of spatial bundling, starting from a secondary component carrier of the first detected subframe, in a frequency axis. Referring to FIG. 21, after spatial bundling performed on SCCs is completed, spatial bundling on a PCC may be performed as necessary.

A start point, a performing direction, and/or an end point of spatial bundling may be determined in advance between the MS and the BS or may be transmitted to the MS through higher layer signaling. Or, the MS may check a channel state and determine them. Some conditions regarding a start point, a performing direction, and/or an end point of spatial bundling may be determined by the MS, while the other remaining conditions may be determined in advance between the BS and the MS or may be transmitted to the MS through higher layer signaling. Relevant information may be transmitted to the BS implicitly.

Referring to FIG. 21, spatial bundling is performed, starting from an SCC in the first detected subframe, along a frequency axis. Spatial bundling is not performed on a CC that transmits 1CW but performed on a CC that transmits 2CW. When spatial bundling performed on an SCC of a corresponding subframe is terminated, spatial bundling may be performed, starting from the first detected SCC of a next subframe, along the frequency axis. Spatial bundling is performed until when a size of payload of the entire HARQ ACK/NACK signals to be transmitted reaches a predetermined bit number. For example, in a case in which spatial bundling is performed until when a size of payload of HARQ ACK/NACK signals reaches 20 bits, when a size of payload of the entire HARQ ACK/NACK signals has reached 20 bits according to the spatial bundling results with respect to the second detected subframe of SCC 1, the MS terminates the spatial bundling. The MS may transmit a spatial-bundled HARQ ACK/NACK signal and an HARQ ACK/NACK signal which has not been spatial-bundled, in the PUCCH format 3.

Figure 22:
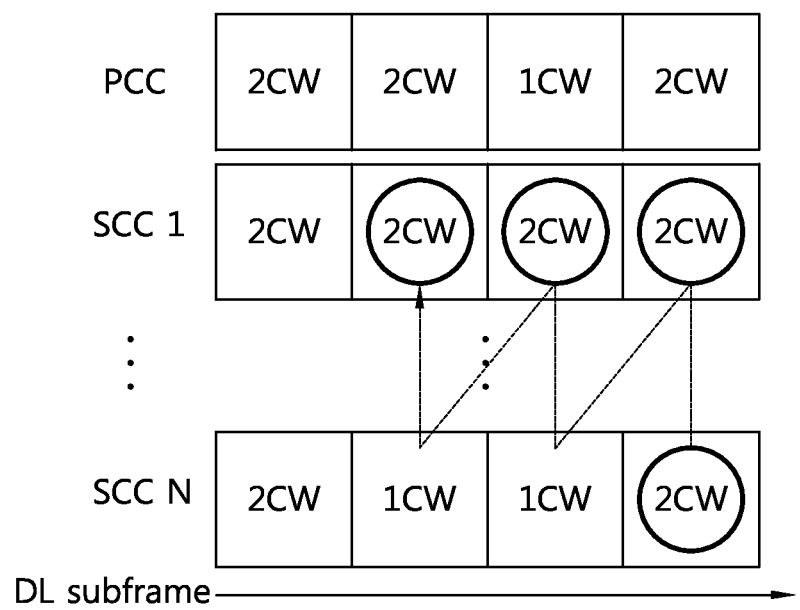
FIG. 22 is a view schematically illustrating performing of spatial bundling, starting from a secondary component carrier of the last detected subframe, in a frequency axis.

FIG. 22 is a view schematically illustrating performing of spatial bundling, starting from a secondary component carrier of the last detected subframe, in a frequency axis.

In comparison to the example of FIG. 21, FIG. 22 illustrates a case in which spatial bundling starts from an SCC of the last detected subframe. A start point, a performing direction, and/or an end point of spatial bundling may be determined in advance between the MS and the BS or may be transmitted to the MS through higher layer signaling. Or, the MS may check a channel state and determine them. Some conditions regarding a start point, a performing direction, and/or an end point of spatial bundling may be determined by the MS, while the other remaining conditions may be determined in advance between the BS and the MS or may be transmitted to the MS through higher layer signaling.

In the both cases of FIGS. 21 and 22, spatial bundling is performed on a PCC, as necessary, after spatial bundling performed on SCCs is completed, but the present invention is not limited thereto and, after spatial bundling performed on SCCs to PCCs with respect to a single subframe, a next subframe may be subjected thereto.

Figure 23:
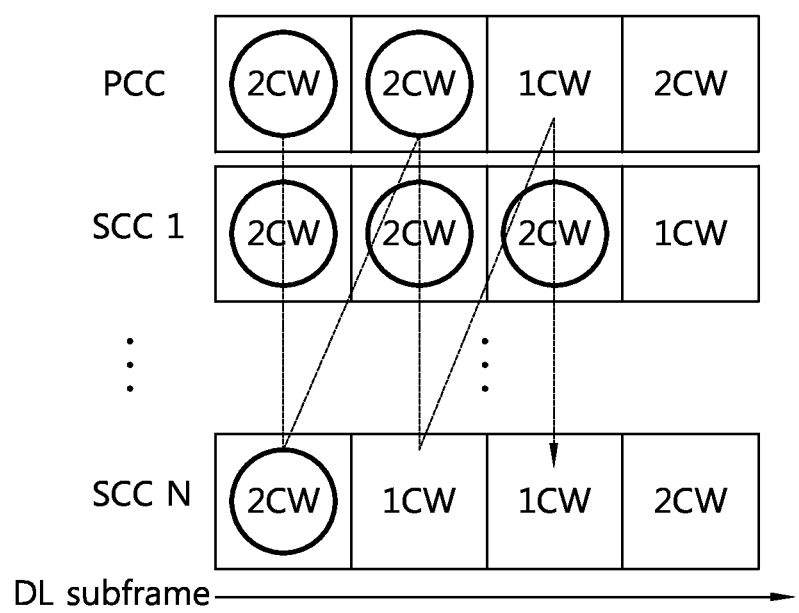
FIG. 23 is a view schematically illustrating performing of spatial bundling, starting from a primary component carrier of the first detected subframe, in a frequency axis.
Figure 24:
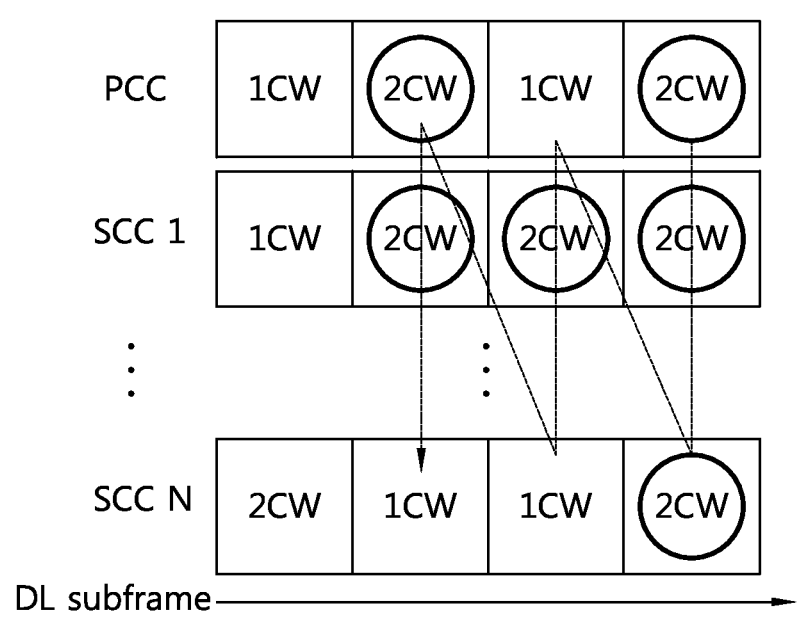
FIG. 24 is a view schematically illustrating performing of spatial bundling, starting from a primary component carrier of the last detected subframe, in a frequency axis.

FIG. 23 is a view schematically illustrating performing of spatial bundling, starting from a primary component carrier of the first detected subframe, in a frequency axis. FIG. 24 is a view schematically illustrating performing of spatial bundling, starting from a primary component carrier of the last detected subframe, in a frequency axis.

Referring to FIGS. 23 and 24, spatial bundling starts from a PCC and is continued to an SCC. Spatial bundling may be performed until when a predetermined termination condition is met, for example, until when a size of payload of the entire HARQ ACK/NACK signals reaches a value less than a predetermined size.

A start point, a performing direction, and/or an end point of spatial bundling may be determined in advance between the MS and the BS or may be transmitted to the MS through higher layer signaling. Or, the MS may check a channel state and determine them. Some conditions regarding a start point, a performing direction, and/or an end point of spatial bundling may be determined by the MS, while the other remaining conditions may be determined in advance between the BS and the MS or may be transmitted to the MS through higher layer signaling. Relevant information may be transmitted to the BS implicitly.

Regarding the embodiments of FIGS. 17 through 24, in a case in which the MS determines a start point of spatial bundling, spatial bundling starts from a CC exposed to a poor communication state, but the MS may also start spatial bundling from a subframe exposed to a poor communication state. For example, the MS may start spatial bundling from a PCC of a subframe exposed to a poor communication state. Also, the MS may determine a start point of spatial bundling in consideration of both a communication state of a CC and that of a subframe. For example, the MS may select a subframe whose communication environment is not good, among CCs exposed to a poor channel state, and start spatial bundling therefrom. Even in these cases, spatial bundling may be performed up to the foregoing end point along the foregoing performing direction.

Figure 25:
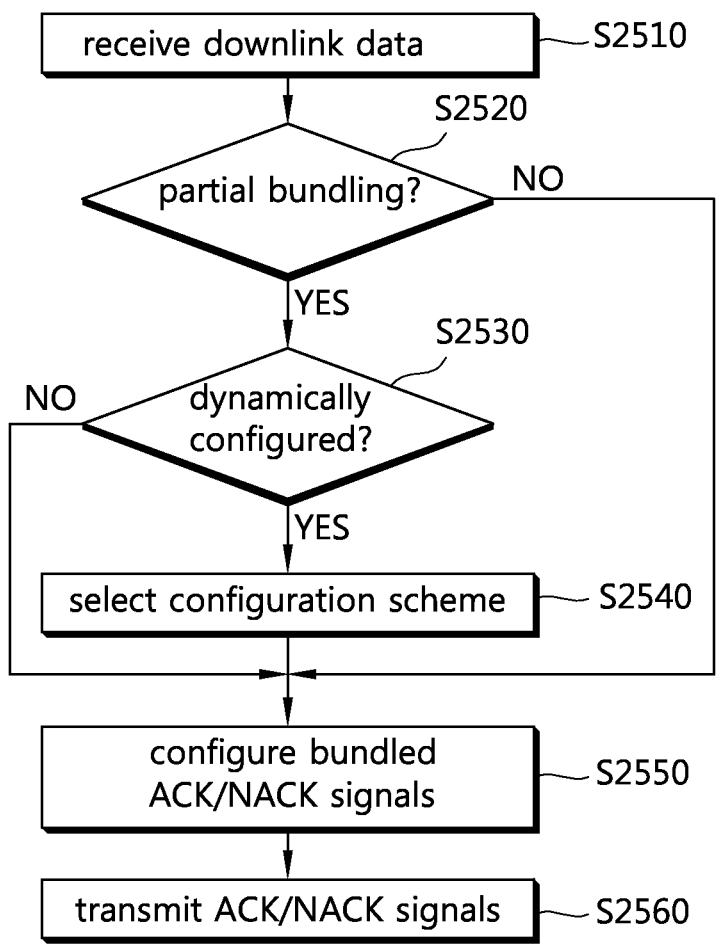
FIG. 25 is a flow chart illustrating a method for operating a terminal in a system to which the present invention is applied.

FIG. 25 is a flow chart illustrating a method for operating a terminal in a system to which the present invention is applied.

The MS receives data from the BS (S2510). The BS may transmit various types of information to the MS via a downlink channel Upon receiving data from the BS, the MS determines whether to select a partial bundling mode to transmit an HARQ ACK/NACK signal with respect to reception of information on, for example, a PDSCH, in the PUCCH format 3 (S2520).

The MS may determine whether to select a partial bundling mode or a full bundling mode. A reference based on which the MS determines a mode of spatial bundling may be determined in advance between the MS and the BS or may be transmitted to the MSS through higher layer signaling.

When the MS does not select the partial bundling mode, namely, when the MS selects the full bundling mode, the MS configures HARQ ACK/NACK signals bundled according to the full bundling mode (S2550).

When the MS selects the partial bundling mode, the MS determines whether to dynamically configure HARQ ACK/NACK signals (S2530). Here, dynamically configuring HARQ ACK/NACK signals refers to dynamically determining, by the MS, at least one of schemes for configuring HARQ ACK/NACK signals by performing spatial bundling in the partial bundling mode.

In a case in which spatial bundling is performed only according to a scheme determined in advance between the MS and the BS or determined through higher layer signaling HARQ ACK/NACK signals are configured, the MS performs the partial bundling mode according to this scheme and configures bundled HARQ ACK/NACK signals (S2550).

When the MS determines to dynamically configures the HARQ ACK/NACK signal, the MS selects necessary schemes (S2540). The MS may select a start point, a performing direction, and/or an end point of spatial bundling. Information required for the MS to select a scheme may be determined in advance between the MS and the BS or may be transmitted to the MS through higher layer signaling. The MS may transmit information regarding the selected scheme implicitly to the BS as mentioned above.

The MS configures the bundled HARQ ACK/NACK signals to be transmitted in the PUCCH format 3 (S2550). In the case in which the MS dynamically configures the HARQ ACK/NACK signals in the partial bundling mode, spatial bundling is performed according to the scheme selected by the MS and bundled HARQ ACK/NACK signals are configured.

The MS transmits the bundled HARQ ACK/NACK signals (S2560).

Figure 26:
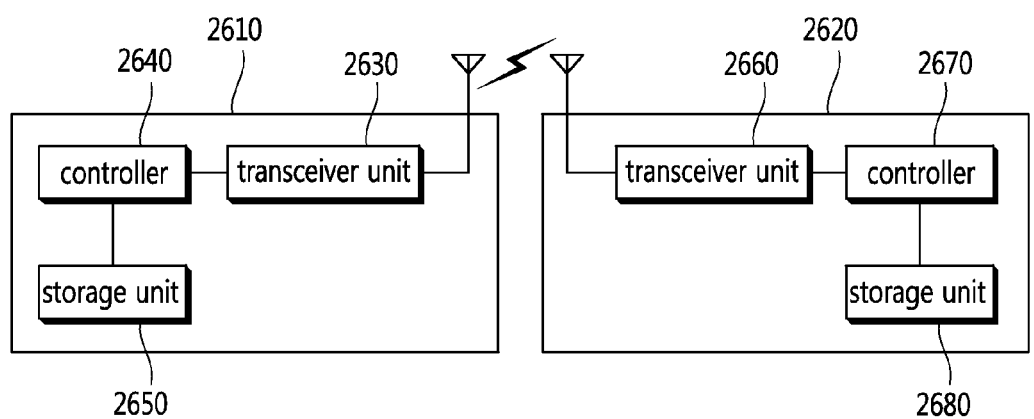
FIG. 26 is a block diagram schematically illustrating an example of a configuration of a base station and a terminal in a system to which the present invention is applied.

FIG. 26 is a block diagram schematically illustrating an example of a configuration of a base station and a terminal in a system to which the present invention is applied.

An MS 2610 may include a transceiver unit 2630, a storage unit 2650, and a controller 2640. The BS 2620 may include a transceiver unit 2660, a storage unit 2680, and a controller 2670.

The transceiver unit 2630 may receive at least one codeword from the BS 2620, in each of a plurality of CCs over a plurality of downlink subframes, and transmits the bundled HARQ ACK/NACK signals to the BS 2620. The bundled HARQ ACK/NACK signals are transmitted in a physical uplink control channel (PUCCH) in a format having capacity equal to or less than 20 bits.

The storage unit 2650 stores required information to allow the MS 2610 to perform wireless communication in a network. For example, the storage unit 2650 may store a mode of spatial bundling that may be set between a BS and the MS in advance and information regarding a performing scheme of each mode. Also, the storage unit 2650 may measure measurement information to be reported to a BS, e.g., CQI, RSRP, RSRQ, or the like, and store the same.

The controller 2640 may be connected to the transceiver unit 2630 and the storage unit 2650 and control them. The controller 2640 may determine a scheme of spatial bundling for transmitting an HARQ ACK/NACK signal in the PUCCH format 3 and perform a bundling procedure for each mode. In detail, the controller 2640 may determine a full bundling mode or a partial bundling mode as a scheme of spatial bundling. For example, when downlink channel quality is worse than a predetermined reference state, the controller 2640 may fully bundle HARQ ACK/NACK signals with respect to a plurality of codewords of respective CCs (full bundling mode), and when downlink channel quality is not worse than a predetermined reference state, the controller 2640 may partially bundle HARQ ACK/NACK signals with respect to a plurality of codewords of respective CCs (partial bundling mode).

Also, the controller 2640 may perform bundling on the basis of a bundling procedure described above with reference to FIGS. 12 through 24. For example, the controller 2640 may bundle HARQ ACK/NACK signals with respect to codewords of respective CCs sequentially from a start CC to a final CC along a frequency axis or time axis. Here, the final CC is a CC at a point at which a size of payload of HARQ ACK/NACK signals that have been bundled and HARQ ACK/NACK signals that have not been bundled, when the bundling is sequentially performed, is equal to or less than a predetermined size.

Information for determining a scheme of spatial bundling by the controller 2640 may be determined in advance between the BS and the MS or may be transmitted through higher layer signaling. The controller 2640 may select a performing scheme on the basis of information stored in the storage unit 2640 and transmit relevant information to the BS through the transceiver unit 2630. When the scheme of spatial bundling is determined, the controller 2640 may perform spatial bundling according to the determined scheme and configure HARQ ACK/NACK signals to be transmitted.

The transceiver unit 2660 may transmit at least one codeword of each of the plurality of CCs over a plurality of downlink subframes to the MS 2610 and receives bundled HARQ ACK/NACK signals from the MS 2610.

The storage unit 2680 stores required information to allow the BS 2620 to perform wireless communication in a network. For example, the storage unit 2680 may store a scheme of spatial bundling that may be set between a BS and the MS in advance and information regarding a performing scheme of a full bundling mode and a partial bundling mode. Also, the storage unit 2680 may store measurement information transmitted from an MS, e.g., CQI, RSRP, RSRQ, or the like.

The controller 2670 may be connected to the transceiver unit 2660 and the storage unit 2680 and control them. The controller 2670 may transmit information required for performing spatial bundling of the MS and information required for configuring HARQ ACK/NACK signals to the MS through the transceiver unit 2660. Also, the controller 2670 may recognize a mode of spatial bundling performed by the MS through the HARQ ACK/NACK signals transmitted from the MS. Also, the controller 2670 may recognize a configuration scheme of partially bundled HARQ ACK/NACK signals on the basis of the measurement information transmitted from the MS, and decode HARQ ACK/NACK signals.

2. Spatial Bundling According to Instruction from BS in PUCCH Format 3

Hereinafter, a method in which a BS determines which spatial bundling scheme is to be selected upon determining a channel state, and the BS transmits the determined spatial bundling scheme to an MS through RRC signaling or on a PDCCH will be described in detail.

Figure 27:
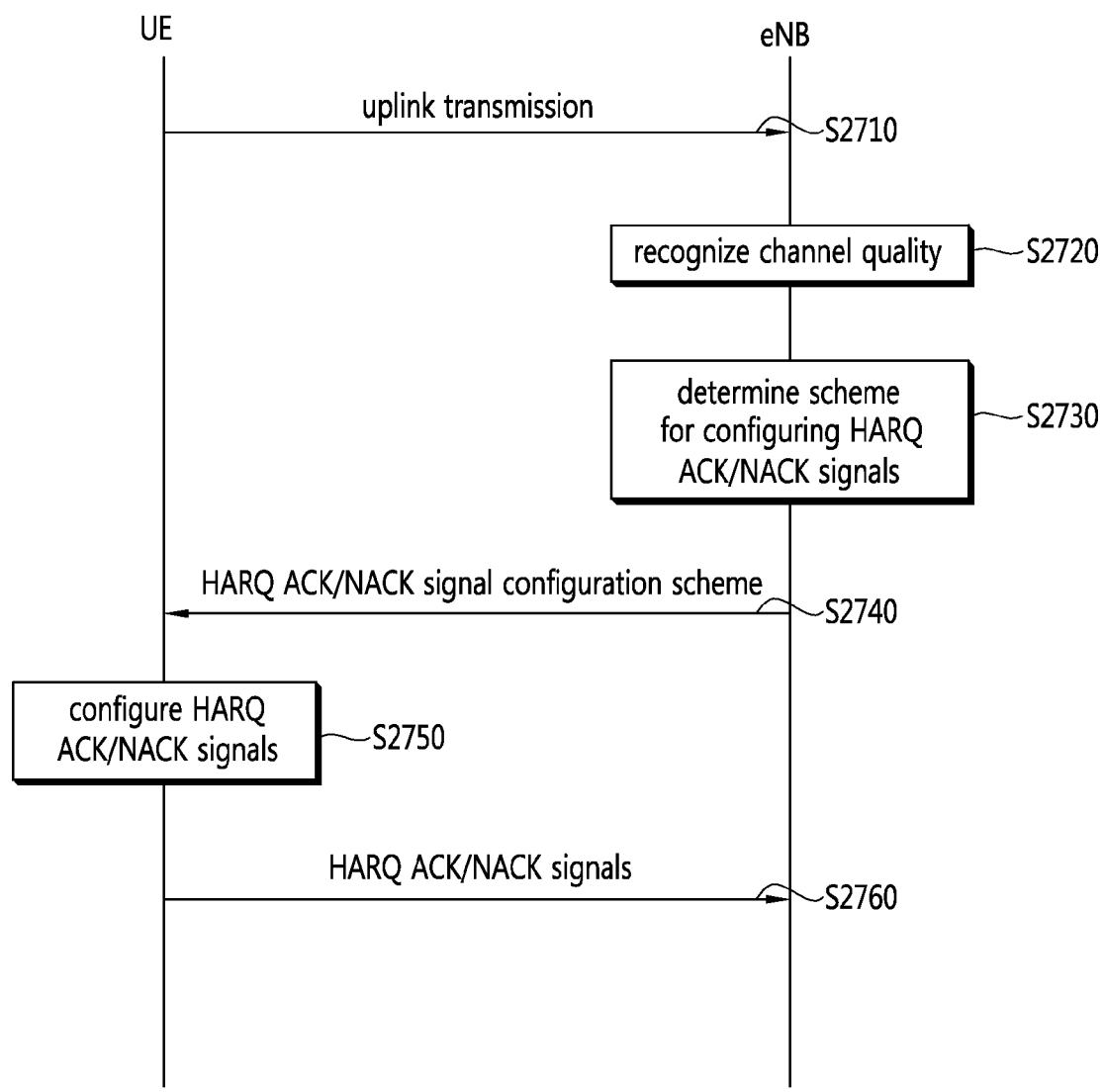
FIG. 27 is a flow chart illustrating a method for transmitting an ACK/NACK signal in PUCCH format 3 by using spatial bundling according to an instruction from a base station in a system to which the present invention is applied.

FIG. 27 is a flow chart illustrating a method for transmitting an ACK/NACK signal in PUCCH format 3 by using spatial bundling according to an instruction from a base station in a system to which the present invention is applied.

Referring to FIG. 27, the MS transmits channel information regarding the MS to the BS periodically or aperiodically via uplink (S2710). In transmitting the channel information regarding the MS to the BS, the MS may transmit measurement information regarding a channel state such as CQI/PMI/RI(CSI), or RSRP or RSRQ together.

CSI (Channel State Information) is information regarding a channel measurement value the MS measures with respect to an activated CC (scheduled CC) and periodically reports to the BS. Through CSI, channel quality of currently scheduled CCs may be determined. RSRP (Reference Signal Received Power) and RSRQ (Reference Signal Received Quality) are values reported by the MS to the BS when a particular event occurs. Unlike a CSI, the RSRP and the RSRQ are information regarding channel quality that may be measured even for a deactivated CC to (unscheduled CC), which may be used as a basis for determining link quality of a corresponding CC at a point in time at which a deactivated CC is activated.

The BS may recognize a channel state through channel information transmitted from the MS (S2720). The BS may recognize a downlink channel state through CSI, RSRP/RSRQ, or the like. Also, the BS may recognize an uplink channel state from an SRS (Sounding Reference Signal) transmitted via uplink or on the basis of a reception state of received data.

The BS may determine a scheme of configuring HARQ ACK/NACK signals of the MS on the basis of the recognized channel state (S2730). In order to transmit HARQ ACK/NACK signals in the PUCCH format 3, payload of the entire HARQ ACK/NACK signals should be equal to or smaller than 20 bits. Thus, in order to transmit the HARQ ACK/NACK signals in the PUCCH format 3, the BS may determine a scheme of spatial bundling of the MS. The scheme of configuring the HARQ ACK/NACK signals may also be called a scheme of spatial bundling.

The BS may determine whether to perform full bundling or partial bundling. When the BS determines to perform partial bundling, the BS may designate a performing scheme of spatial bundling to be performed by the MS. Namely, the BS may determine a start point, a performing direction, and an end point of spatial bundling to be performed by the MS. Also, when the BS determines to perform partial bundling, the BS may designate a target of spatial bundling to be performed by the MS. Namely, the BS may determine HARQ ACK/NACK signals with respect to which CCs in which subframe are to be spatial-bundled.

For example, on the basis of a downlink channel state, the BS may determine to spatial-bundle HARQ ACK/NACK signals with respect to CCs in a subframe indicating a poor channel state so that unnecessary retransmission is not made because HARQ ACK/NACK signals with respect to respective CWs are NACK among CCs in the subframe that transmits 2CW. Also, on the basis of a downlink channel state, the BS may determined not to spatial-bundle HARQ ACK/NACK signals with respect to CCs in a subframe indicating a good channel state because HARQ ACK/NACK signals with respect to respective CWs are ACK among CCs in the subframe that transmits 2CW.

For example, on the basis of a channel state of the MS, if the channel state is poor, the BS may determine to perform spatial bundling until when a size of payload of all the HARQ ACK/NACK signals transmitted in a single uplink subframe reaches a particular size, in order to increase transmission power per bit. Also, on the basis of the channel state of the MS, when the channel state is worse than a predetermined reference value, the BS may determine to perform full bundling on HARQ ACK/NACK signals transmitted in a single uplink subframe.

When the BS determines a scheme for configuring HARQ ACK/NACK signals to be performed by the MS, the BS may transmit relevant information to the MS (S2740). The BS may transmit the information regarding the scheme for configuring the HARQ ACK/NACK signals to the MS through RRC signaling or may transmit the same to the MS on a PDCCH. In case of transmitting the information on the PDCCH, the BS may transmit information regarding a to scheme for configuring HARQ ACK/NACK signals by using spare bits or by increasing the number of bits of control data transmitted on a PDCCH.

On the basis of the received information regarding the scheme for configuring the HARQ ACK/NACK signals, the MS configures HARQ ACK/NACK signals with respect to PDSCHs transmitted via downlink (S2750).

The MS may perform full bundling or partial bundling according to an instruction from the BS. In a case in which the BS instructs partial bundling by specifying a start point, a performing direction, and an end point of spatial bundling, the MS may perform spatial bundling on the basis of the start point, the performing direction, and the end point of the spatial bundling specified by the BS. In a case in which the BS instructs partial bundling by specifying CCs in a subframe on which spatial bundling is to be performed, the MS may perform spatial bundling only on CCs on a subframe specified by the BS.

Also, in a case in which the BS instructs full bundling, the MS may perform spatial bundling on the entire HARQ ACK/NACK signals to be performed in a single uplink subframe.

Payload of the entire HARQ ACK/NACK signals configured according to the scheme for configuring HARQ ACK/NACK signals instructed by the BS is less than 20 bits. In case of performing full bundling, the MS may configure the entire HARQ ACK/NACK signals with HARQ ACK/NACK signals that have been bundled and HARQ ACK/NACK signals that have not been bundled (HARQ ACK/NACK signals with respect to CCs in a downlink subframe that has transmitted 1CW). In case of performing partial bundling, the MS may configure the entire HARQ ACK/NACK signals with HARQ ACK/NACK signals that have been bundled and HARQ ACK/NACK signals that have not been bundled (HARQ ACK/NACK signals with respect to CCs in a downlink subframe that has transmitted 2CW not bundled and HARQ ACK/NACK signals with respect to CCs in a downlink subframe that has transmitted 1CW).

The MS transmits the configured HARQ ACK/NACK signals to the BS (S2760). The BS may recognize bundled HARQ ACK/NACK signals and unbundled HARQ ACK/NACK signals according to the HARQ ACK/NACK signal configuration scheme instructed to the MS and the downlink transmission mode (whether it is 1CW transmission or 2CW transmission).

Hereinafter, the determination by the BS with respect to the HARQ ACK/NACK signal configuration scheme of the MS and HARQ ACK/NACK signal configuration of the MS according to the determination will be described in detail.

<Selection of Full Bundling Mode and Partial Bundling Mode>

In a case in which spatial-bundled HARQ ACK/NACK signals are NACK even when the MS does not properly receive only one CW, the BS transmits the entire CWs again, so the already properly received CW may be unnecessarily retransmitted.

Meanwhile, when the MS bundles HARQ ACK/NACK signals and transmits the same, transmission power per bit may be advantageously increased in terms of limited power transmission of the MS. Another advantage is that the number of bits used to transmit the HARQ ACK/NACK signals is reduced.

Thus, the BS may more effectively perform HARQ ACK/NACK signal transmission by appropriately selecting the full bundling mode and the partial bundling mode in consideration of a current communication state. For example, in a case in which a channel state is poor because the MS is located in the edge of cell coverage, the MS may be allowed to be use the full bundling mode to increase transmission power per bit used to transmit the HARQ ACK/NACK signal. Also, in a channel environment in which a credible error rate is anticipated in transmission of the HARQ ACK/NACK signals, the BS may seek effective use of transmission resource by allowing the MS to use the partial bundling mode.

The BS may recognize a downlink channel state through CSI, RSRP/RSRQ, or the like. Also, the BS may estimate or recognize a channel state of the MS from CSI, RSRP/RSRQ, or the like, on the basis of a reception state of data received from the MS or on the basis of reciprocity.

Thus, when the recognized channel state of the MS is worse than a predetermined reference value, the BS may instruct full bundling to increase a reception rate of HARQ ACK/NACK signals transmitted via uplink. Also, the recognized downlink channel state is not worse than the predetermined reference value, the BS may instruct partial bundling to increase retransmission efficiency and promote effective use of transmission resource.

<In Case of Full Bundling Mode>

Figure 28:
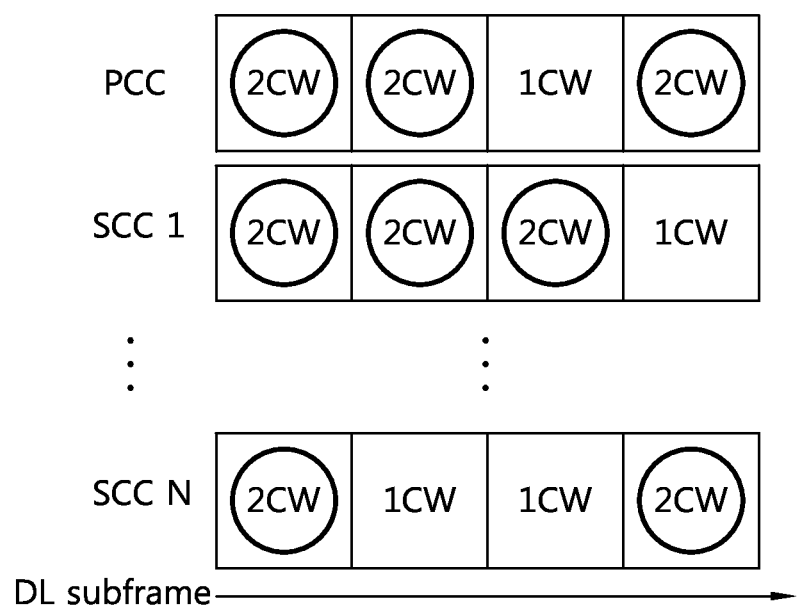
FIG. 28 is a view schematically illustrating an embodiment regarding a method for performing overall bundling in the system to which the present invention is applied.

FIG. 28 is a view schematically illustrating an embodiment regarding a method for performing overall bundling in the system to which the present invention is applied. An example in which four downlink subframes are associated with a single uplink subframe will be described with reference to FIG. 28.

Data may be transmitted in a plurality of CCs of a single downlink subframe. Among the plurality of CCs, one CC may be a primary component carrier (PCC) and the other remaining CCs may be secondary component carriers (SCCs).

The PCC may be in a constantly activated state, namely, in a state in which the PCC may be scheduled (or a state in which the BS may transmit a PDCCH to the MS anytime), and the SCCs may be in an activated state or in a deactivated state. Hereinafter, in the following description of the present disclosure, it is assumed that a CC is a configured CC, unless otherwise mentioned.

Referring to FIG. 28, a CC may transmit one CW (1CW) or two CWs (2CW) in each subframe. In FIG. 28, a circle encircling each 2CW means that HARQ ACK/NACK signals with respect to the corresponding 2CW were spatial-bundled. Thus, in FIG. 28, it can be seen that the HARQ ACK/NACK signals with respect to downlink subframes associated with a single uplink subframe are full-bundled.

When the instruction of the full bundling mode is received, the MS performs spatial bundling on every CC which has transmitted 2CW in the subframes associated with the single uplink subframe.

In the case of full bundling, the BS, which has received the entire HARQ ACK/NACK signals, may recognize whether the corresponding HARQ ACK/NACK signals are spatial-bundled HARQ ACK/NACK signals on the basis of a transmission mode (whether it is 1CW transmission or 2CW transmission) of the CCs transmitted via downlink.

<Partial Bundling Mode—Designating Scheme for Performing Spatial Bundling>

In order to transmit HARQ ACK/NACK signals in the PUCCH format 3, the BS may perform partial spatial bundling.

In order to perform spatial bundling on some CCs which have transmitted 2CW in the downlink subframe associated with one uplink subframe, the following partial bundling scheme is in question: (1) where spatial bundling is to start in HARQ ACK/NACK signals with respect to CCs of a downlink subframe (start point); (2) in what direction spatial bundling is to be performed (performing direction); and (3) where spatial bundling is to be terminated in HARQ ACK/NACK signals with respect to CCs of a downlink subframe (end point). The BS may determine a performing scheme regarding a start point, a performing direction, an end point, and the like, of spatial bundling in consideration of a channel environment, or the like, and transmit the same to the MS through RRC signaling, or on a PDCCH.

Start Point of Spatial Bundling

The BS may allow the MS may perform spatial bundling, starting from a CC exposed to a poor channel environment. In the case of a CC exposed to a poor channel environment, all HARQ ACK/NACK signals with respect to two CWs are highly likely to be NACK. Thus, it may be considered that a possibility that unnecessary retransmission is made through spatial bundling is low.

Also, the BS may allow the MS to perform spatial bundling, starting from a subframe exposed to a poor channel environment. Also, in the case of a subframe exposed to a poor channel environment, all HARQ ACK/NACK signals with respect to two CWs are highly likely to be NACK. Thus, transmission efficiency can be further enhanced through spatial bundling. Also, in the case of a subframe exposed to a poor channel environment, all HARQ ACK/NACK signals with respect to two CWs are highly likely to be NACK. Thus, transmission efficiency can be further enhanced through spatial bundling.

Also, the BS may allow the MS to first perform spatial bundling on an SCC. In general, in terms of frequency of scheduling, a PCC tends to be more frequently scheduled than an SCC, so performing spatial bundling first on an SCC which is less frequently scheduled may be considered.

Here, a channel environment and a primary/secondary component carrier have been described as examples of selecting a start point of spatial bundling, but the present invention is not limited thereto and a start point of spatial bundling may be selected according to various other references.

Direction for Performing Spatial Bundling

Spatial bundling may be performed in various directions. Unlike full bundling, in case of partial bundling, a start point of spatial bundling may be selected in consideration of a channel state and in which direction from the start point spatial bundling is to be performed may be determined.

FIGS. 29 through 32 are views schematically illustrating examples of various directions in which spatial bundling is performed with respect to HARQ ACK/NACK signals of component carriers of downlink subframes associated with a single uplink subframe in the system to which the present invention is applied.

Spatial bundling may be performed by subframes. Namely, spatial bundling may be performed in a frequency axis direction. Also, spatial bundling may be performed by same CCs. Namely, spatial bundling may be performed in a time axis direction.

Figure 29:
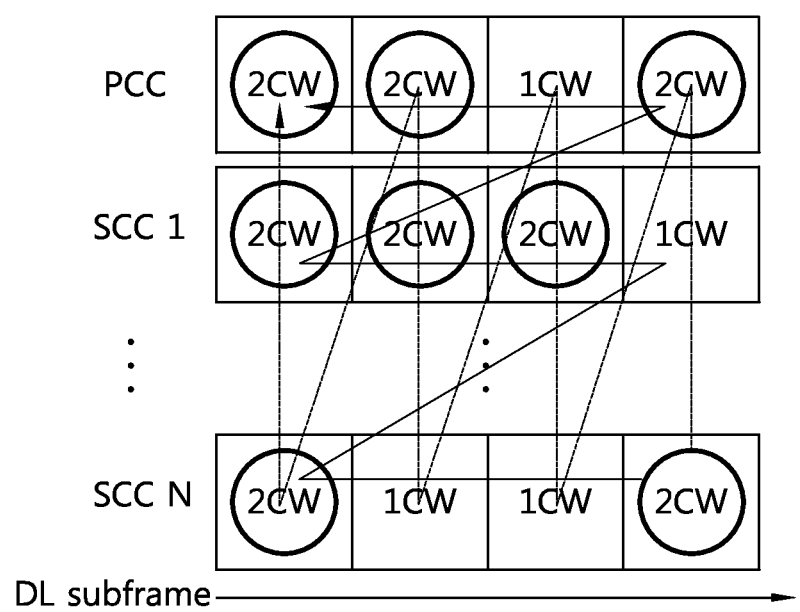
FIGS. 29 through 32 are views schematically illustrating examples of various directions in which spatial bundling is performed with respect to HARQ ACK/NACK signals of component carriers of downlink subframes associated with a single uplink subframe in the system to which the present invention is applied.
Figure 30:
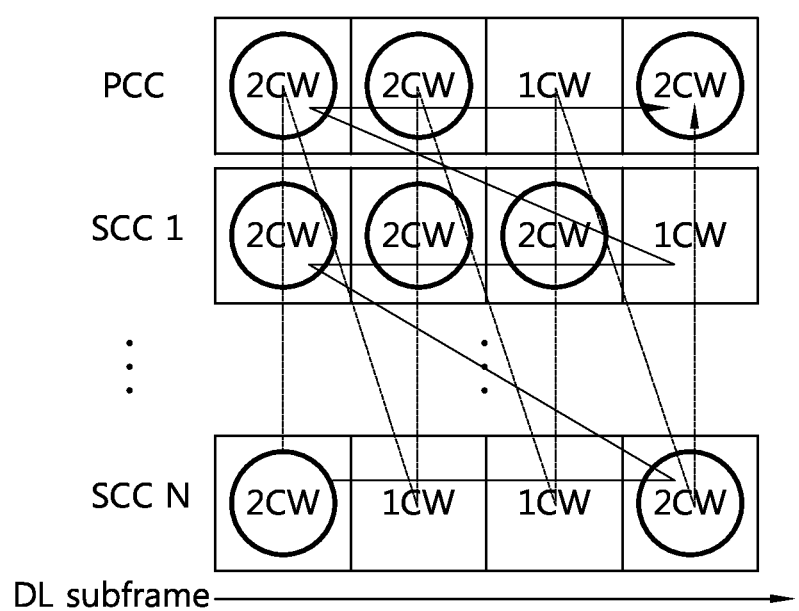
Figure 31:
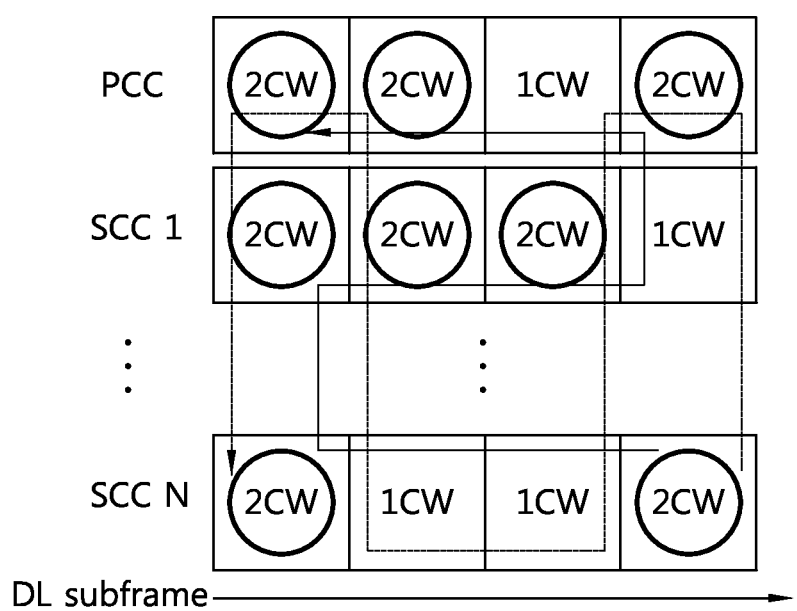
Figure 32:
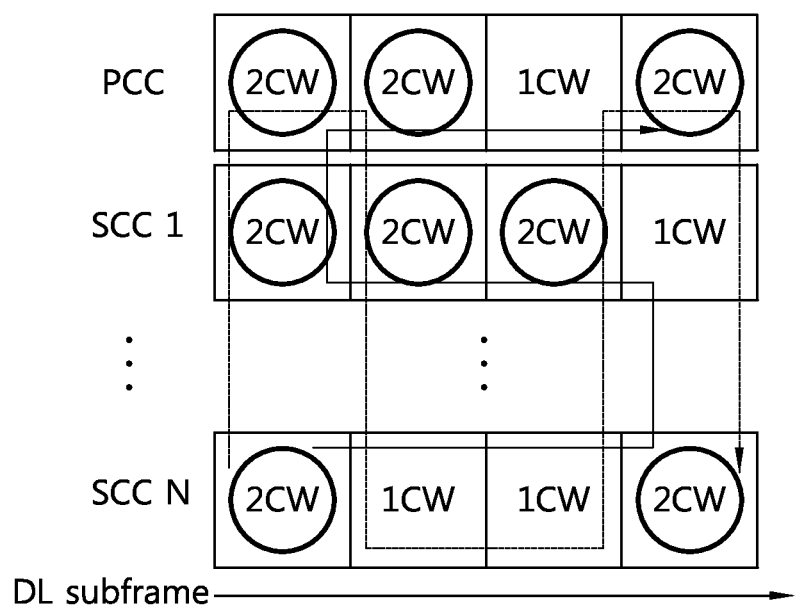

FIGS. 29 and 31 illustrate performing of spatial bundling, starting from HARQ ACK/NACK signals with respect to the last detected CC. FIGS. 30 and 32 illustrate performing of spatial bundling, starting from HARQ ACK/NACK signals with respect to the first detected CC. In FIGS. 29 to 32, the solid lines indicate directions in which spatial bundling is performed along a time axis, and the dotted lines indicate directions in which spatial bundling is performed along a frequency axis. Detecting a CC refers to receiving or decoding data of a CC.

A direction in which spatial bundling is performed is related to order of ACK/NACK signals of CCs in the downlink subframe among the entire bundled HARQ ACK/NACK signals. Thus, the BS may check whether data, which was transmitted by CCs in the downlink subframe, has been received according to the performing direction of spatial bundling.

Here, a performing direction of spatial bundling as illustrated in FIGS. 31 through 34 is described as an example of a scheme to which the present invention is applied, but the present invention is not limited thereto and spatial bundling may be performed in various directions.

End Point of Spatial Bundling

A BS may allow an MS to perform spatial bundling until when payload of the entire HARQ ACK/NACK signals to be transmitted in a single uplink subframe has a predetermined size. Namely, a target of the special bundling is the CC that transmits 2CW. Thus, while spatial bundling is being performed to bundle HARQ ACK/NACK signals with respect to the CC that transmits 2CW into a 1-bit representative signal, when the entire payload size of the spatial-bundled HARQ ACK/NACK signals and HARQ ACK/NACK signals which have not been spatial-bundled (i.e., HARQ ACK/NACK signals with respect to the CC that transmits 1CW and the HARQ ACK/NACK signals with respect to the CC which transmits 2CW and which has not spatial-bundled) is equal to or less than a predetermined size, the BS may stop spatial bundling. For example, in the present embodiment in which HARQ ACK/NACK signals are transmitted by using the PUCCH format 3, when the payload size of the entire HARQ ACK/ NACK signals is equal to or less than 20 bits, spatial bundling may be terminated. When spatial bundling is terminated, the MS may multiplex the spatial-bundled HARQ ACK/NACK signals and the HARQ ACK/NACK signals which have not been spatial-bundled to configure the entire HARQ ACK/ NACK signals.

Also, when to terminate spatial bundling may be determined in relation to a magnitude of the HARQ ACK/NACK signals to be transmitted. Thus, as described above, in a case in which a channel environment is not good, the BS may change an end point of spatial bundling in order to increase transmission power per transmission bit.

Hereinafter, specific embodiments of performing partial bundling according to an instruction regarding a partial bundling performing scheme from a BS will be described with reference to the accompanying drawings. For the description purpose, the same content as that described above in the former embodiments will be omitted in the following embodiments.

Scheme of Performing Spatial Bundling Along Time Axis

In consideration of a channel environment, or the like, a BS may determine to perform spatial bundling on CCs having a poor channel environment along a time axis, and instructs an MS accordingly.

Figure 33:
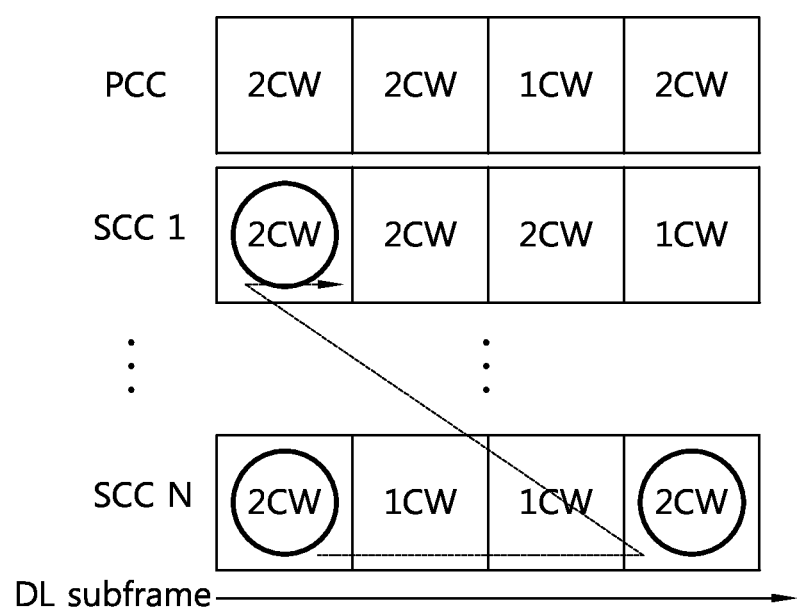
FIG. 33 is a view schematically illustrating performing of spatial bundling, starting from an HARQ ACK/NACK signal with respect to a secondary component carrier of the first detected subframe, in a time axis.

FIG. 33 is a view schematically illustrating performing of spatial bundling, starting from an HARQ ACK/NACK signal with respect to a secondary component carrier of the first detected subframe, in a time axis.

Referring to FIG. 33, the BS may instruct the MS to perform spatial bundling, starting from an HARQ ACK/NACK signal with respect to an SCC in the first detected subframe, along a time axis. Spatial bundling is not performed on a subframe that transmits 1CW but performed on a subframe that transmits 2CW. When spatial bundling performed on a corresponding CC is terminated, spatial bundling may be performed, starting from the first detected subframe of a next CC, along the time axis. Spatial bundling is performed until when a size of payload of the entire HARQ ACK/NACK signals to be transmitted reaches a predetermined bit number. For example, in a case in which spatial bundling is performed until when a size of payload of HARQ ACK/NACK signals reaches 20 bits, when a size of payload of the entire HARQ ACK/NACK signals has reached 20 bits according to the spatial bundling results with respect to the first detected subframe of SCC 1, the MS terminates the spatial bundling. The MS may transmit a spatial-bundled HARQ ACK/NACK signal and an HARQ ACK/NACK signal which has not been spatial-bundled, in the PUCCH format 3.

Figure 34:
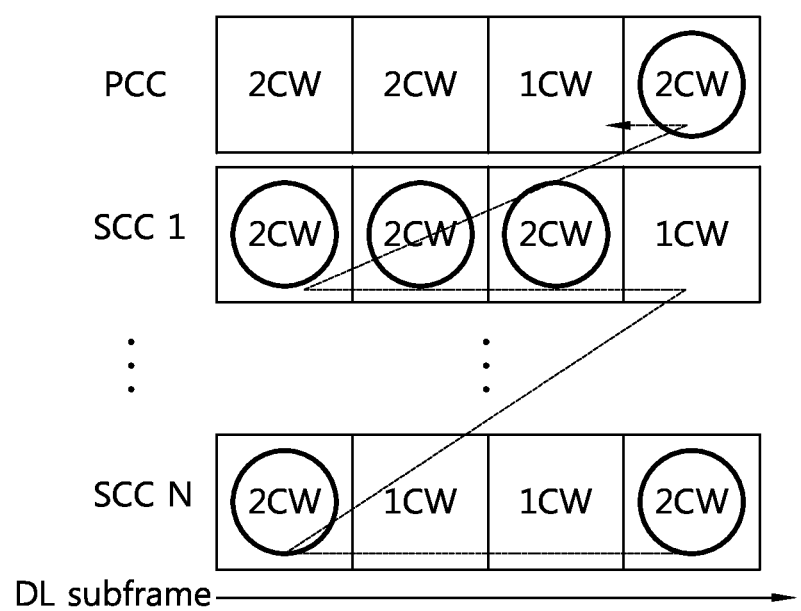
FIG. 34 is a view schematically illustrating performing of spatial bundling, starting from an HARQ ACK/NACK signal with respect to a secondary component carrier of the last detected subframe, in a time axis.

FIG. 34 is a view schematically illustrating performing of spatial bundling, starting from an HARQ ACK/NACK signal with respect to a secondary component carrier of the last detected subframe, in a time axis.

In both cases of FIGS. 33 and 34, the MS may perform spatial bundling up to an end point of spatial bundling instructed by the BS. For example, it is described that spatial bundling is performed on the HARQ ACK/NACK signals with respect to SCCs, but even after spatial bundling with respect to the SCCs is completed, if the payload size of the entire HARQ ACK/NACK signals is greater than a predetermined size, e.g., 20 bits, the MS may perform spatial bundling even on a PCC.

Figure 35:
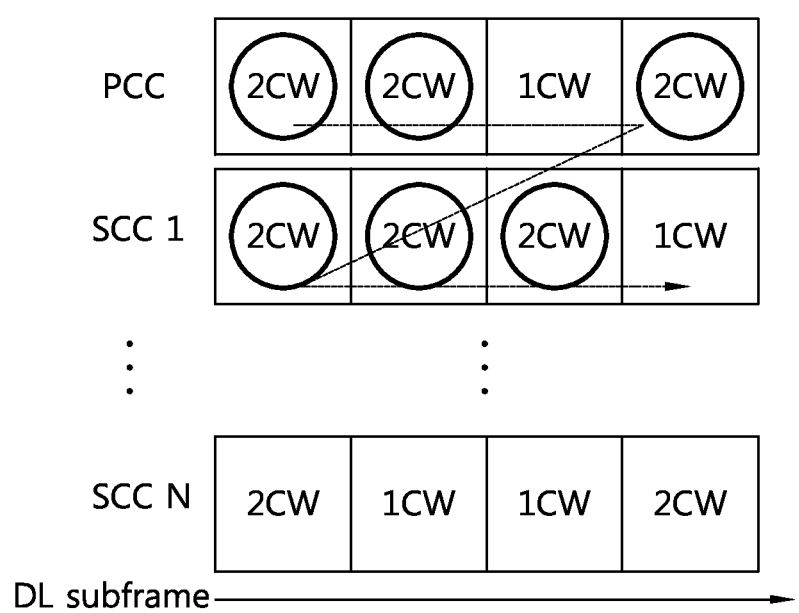
FIG. 35 is a view schematically illustrating performing of spatial bundling, starting from an HARQ ACK/NACK signal with respect to a primary component carrier of the first detected subframe, in a time axis.
Figure 36:
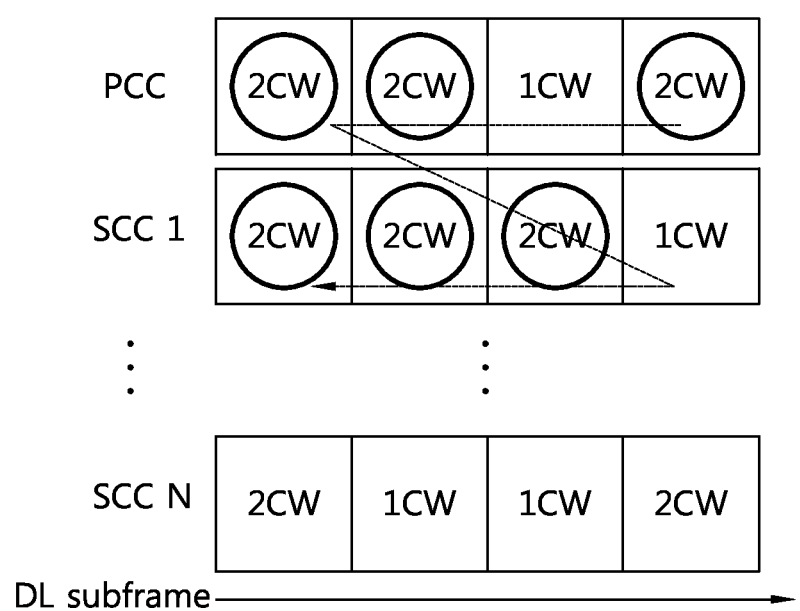
FIG. 36 is a view schematically illustrating performing of spatial bundling, starting from an HARQ ACK/NACK signal with respect to a primary component carrier of the last detected subframe, in a time axis.

FIG. 35 is a view schematically illustrating performing of spatial bundling, starting from an HARQ ACK/NACK signal with respect to a primary component carrier of the first detected subframe, in a time axis. FIG. 36 is a view schematically illustrating performing of spatial bundling, starting from an HARQ ACK/NACK signal with respect to a primary component carrier of the last detected subframe, in a time axis.

Referring to FIGS. 35 and 36, spatial bundling may be performed on HARQ ACK/NACK signals with respect to a PCC to HARQ ACK/NACK signals with respect to SCCs. Spatial bundling may be performed up to a predetermined end point indicated by the BS, e.g., until when a payload size of the entire HARQ ACK/NACK signals is equal to or smaller than a predetermined size.

Scheme of Performing Spatial Bundling Along Frequency Axis

In consideration of a channel environment, or the like, a BS may determine to perform spatial bundling on a subframe having a poor channel environment along a frequency axis, and instructs an MS accordingly.

Figure 37:
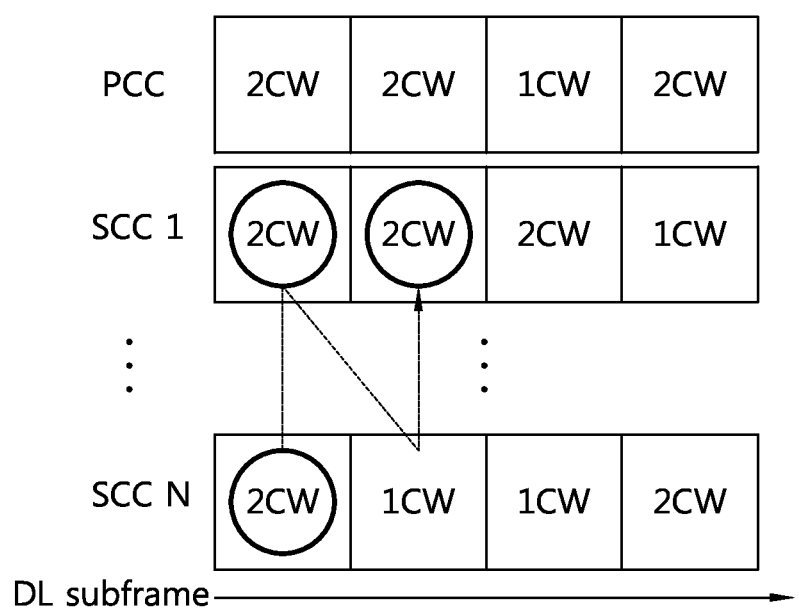
FIG. 37 is a view schematically illustrating performing of spatial bundling, starting from an HARQ ACK/NACK signal with respect to a secondary component carrier of the first detected subframe, in a frequency axis.

FIG. 37 is a view schematically illustrating performing of spatial bundling, starting from an HARQ ACK/NACK signal with respect to a secondary component carrier of the first detected subframe, in a frequency axis.

Referring to FIG. 37, an HARQ ACK/NACK signal with respect to an SCC in the first detected subframe is first spatial-bundled, and spatial bundling is performed along a frequency axis. Spatial bundling is not performed on CCs that transmit 1CW but performed on CCs that transmit 2CW. When spatial bundling performed on a corresponding subframe is terminated, spatial bundling may be performed, starting from the first detected SCC of a next subframe, along the frequency axis. Spatial bundling is performed until when a size of payload of the entire HARQ ACK/NACK signals to be transmitted reaches a predetermined bit number. For example, in a case in which spatial bundling is performed until when a size of payload of HARQ ACK/NACK signals reaches 20 bits, when a size of payload of the entire HARQ ACK/NACK signals has reached 20 bits according to the spatial bundling results with respect to the second detected subframe of SCC 1, the MS terminates the spatial bundling. The MS may transmit a to spatial-bundled HARQ ACK/NACK signal and an HARQ ACK/NACK signal which has not been spatial-bundled, in the PUCCH format 3.

Figure 38:
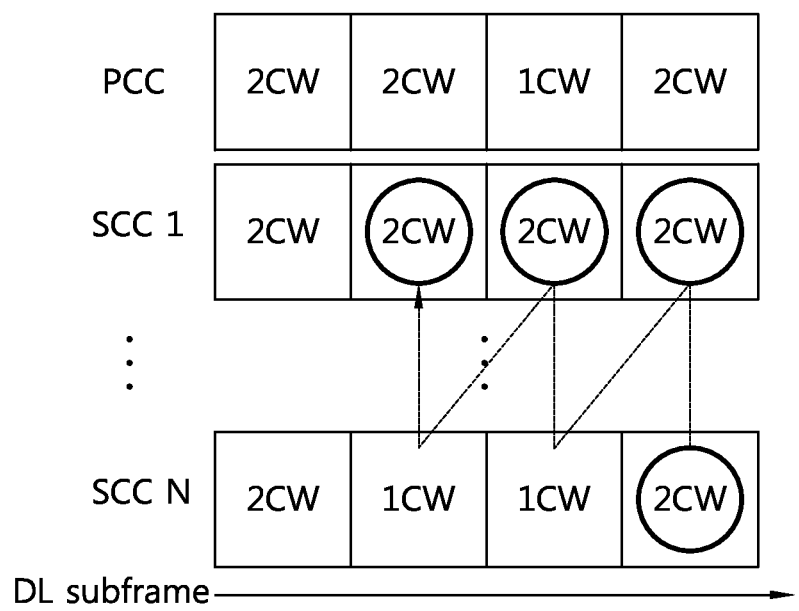
FIG. 38 is a view schematically illustrating performing of spatial bundling, starting from an HARQ ACK/NACK signal with respect to a secondary component carrier of the last detected subframe, in a frequency axis.

FIG. 38 is a view schematically illustrating performing of spatial bundling, starting from an HARQ ACK/NACK signal with respect to a secondary component carrier of the last detected subframe, in a frequency axis.

In both cases of FIGS. 37 and 38, after HARQ ACK/NACK signals with respect to SCCs are spatial-bundled, HARQ ACK/NACK signals with respect to a PCC are spatial-bundled as necessary, but the present invention is not limited thereto, and the HARQ ACK/NACK signals with respect to the PCC may be spatial-bundled together with the HARQ ACK/NACK signals with respect to the SCCs along a performing path of spatial bundling.

Figure 39:
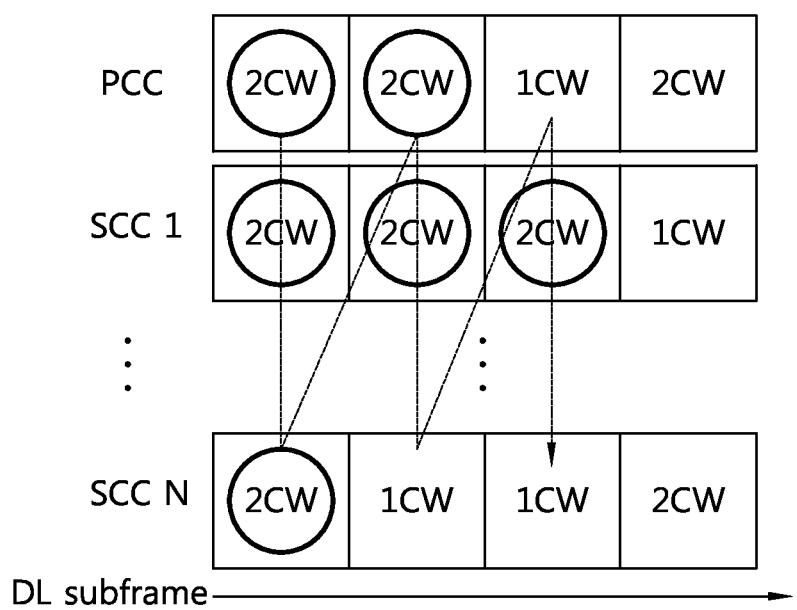
FIG. 39 is a view schematically illustrating performing of spatial bundling, starting from an HARQ ACK/NACK signal with respect to a primary component carrier of the first detected subframe, in a frequency axis.
Figure 40:
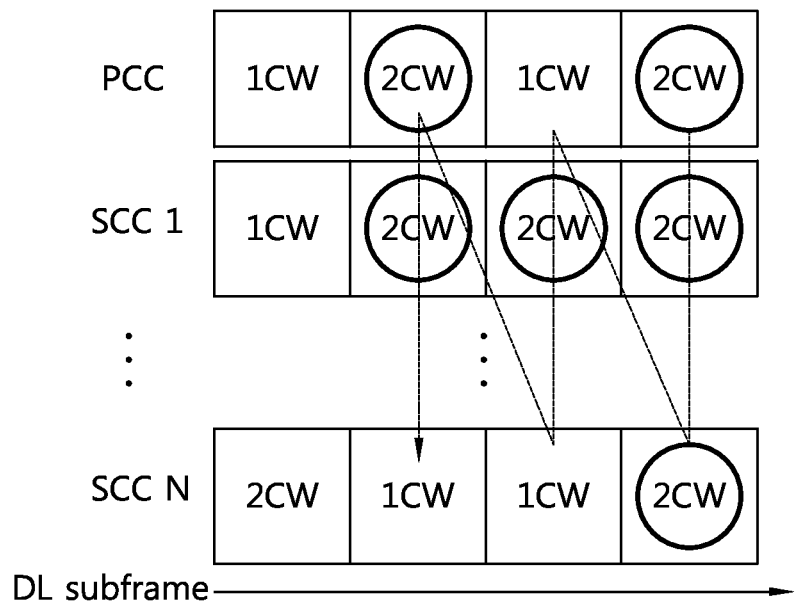
FIG. 40 is a view schematically illustrating performing of spatial bundling, starting from an HARQ ACK/NACK signal with respect to a primary component carrier of the last detected subframe, in a frequency axis.

FIG. 39 is a view schematically illustrating performing of spatial bundling, starting from an HARQ ACK/NACK signal with respect to a primary component carrier of the first detected subframe, in a frequency axis. Unlike FIG. 39, FIG. 40 is a view schematically illustrating performing of spatial bundling, starting from an HARQ ACK/NACK signal with respect to a primary component carrier of the last detected subframe, in a frequency axis. Referring to FIGS. 39 and 40, spatial bundling may be performed, starting from the HARQ ACK/NACK signals with respect to the PCC and continue to HARQ ACK/NACK signals with respect to the SCCs. Spatial bundling may be performed up to a predetermined end point according to an instruction from the BS. For example, the MS may perform spatial bundling until when a payload size of the entire HARQ ACK/NACK signals is equal to or smaller than a predetermined size.

In the embodiment with respect to FIGS. 33 to 40 as described above, a performing scheme of partial bundling such as a start point of spatial bundling, a performing direction, an end point, and the like, may be determined by the BS in consideration of a channel environment. The BS may transmit information/instruction regarding the determined performing scheme of partial bundling to the MS through RRC signaling or on a PDCCH.

Meanwhile, in the embodiments of FIGS. 33 to 40, in the case in which the BS determines a performing scheme of spatial bundling, a communication state of CCs is considered, but here, the BS may also consider a communication state of a subframe. For example, the BS may allow spatial bundling to be performed, starting from an HARQ ACK/NACK signal with respect to a PCC of a subframe having a poor communication state.

Also, the BS may determine a start point of spatial bundling in consideration of a communication state of CCs and a communication state of a subframe. For example, the BS may select a subframe exposed to a poor communication environment among CCs having a poor channel state, and start spatial bundling.

<Partial Bundling Mode—Designation of Target of Spatial Bundling>

In a case in which the BS determines to instruct the MS to perform partial bundling, the BS may specifically designate a target of spatial bundling to be performed by the MS. For example, the BS may check a channel state changing over time and/or frequency, and specifically designate HARQ ACK/NACK signals with respect to CCs in a certain subframe, which are to be spatial-bundled.

The BS may transmit information regarding a target of spatial bundling to the MS through RCC signaling or on a PDCCH.

Figure 41:
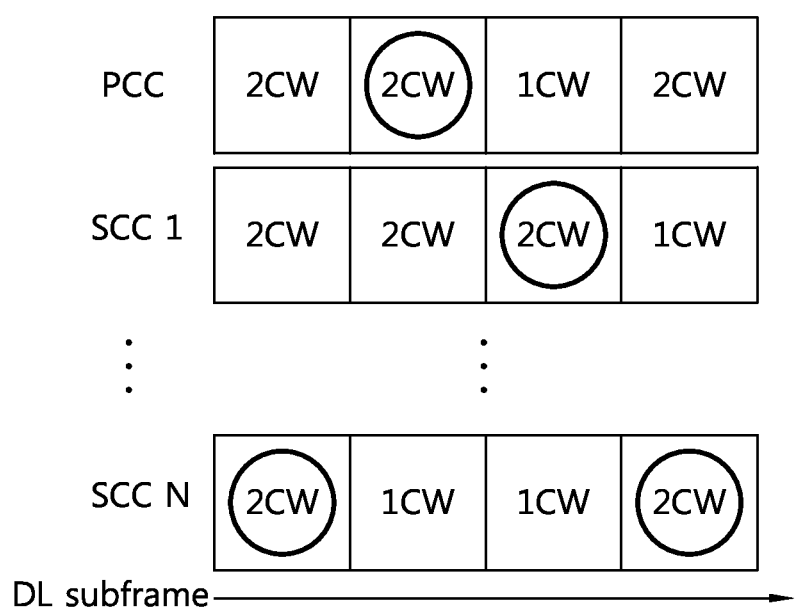
FIG. 41 is a schematically view illustrating an embodiment in which a base station designates a target of bundling and a terminal performs spatial bundling accordingly in a system to which the present invention is applied.

FIG. 41 is a schematically view illustrating an embodiment in which a base station designates a target of bundling and a terminal performs spatial bundling accordingly in a system to which the present invention is applied.

Referring to FIG. 41, the BS may designate a particular CC among CCs in a downlink subframe that transmits 2CS, and instructs the MS to bundle HARQ ACK/NACK signals with respect to each CW. For example, in the example illustrated in FIG. 23, the BS does not instruct the MS to perform spatial bundling on HARQ ACK/NACK signals with respect to the PCC in the first received downlink subframe but instructs the MS to perform spatial bundling on the second received PCC in the downlink subframe.

Here, for the description purpose, the BS designates a target of spatial bundling, but the present invention is not limited thereto and the BS may designate a target on which spatial bundling is not to be performed. In this case, among CCs that transmit 2CW, the MS may spatial-bundle only HARQ ACK/NACK signals with respect to CCs in the downlink subframe not designated by the BS.

For example, in the case of FIG. 41, the BS may instruct the MS to spatial-bundle HARQ ACK/NACK signals with respect to the PCC in the second received downlink subframe, and instruct the MS not to spatial-bundle HARQ ACK/NACK signals with respect to the PCC in the first subframe and HARQ ACK/NACK signals with respect to PCCs in the fourth subframe.

<Partial Bundling Mode—Mixture Scheme>

While transmitting an instruction to perform a partial bundling mode to the MS, the BS may also designate a performing scheme and a performing target of spatial bundling together.

For example, the BS may determine a start point, a performing direction, and an end point of spatial bundling, determine a target on which spatial bundling is not to be performed, and relevant information to the MS.

Figure 42:
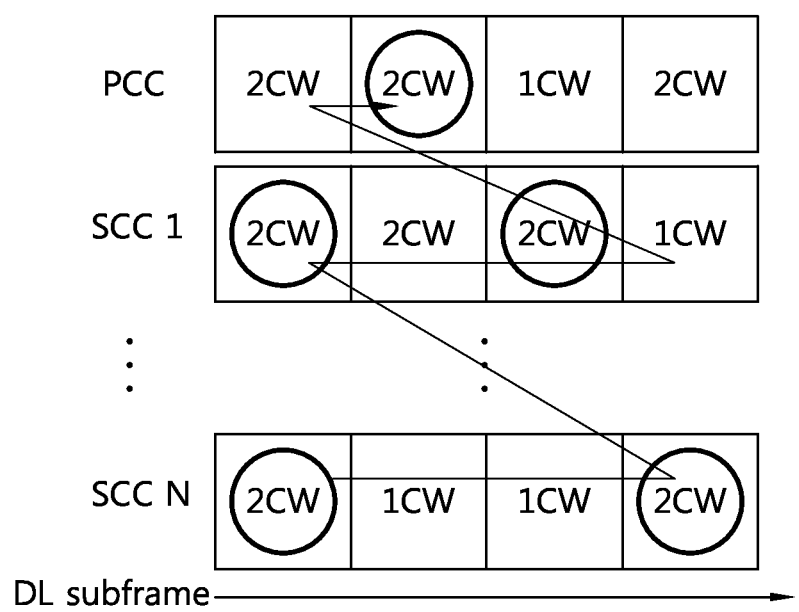
FIG. 42 is a schematically view illustrating an embodiment in which a terminal performs spatial bundling on the basis of a start point, performing direction of spatial bundling, and an end point determined by a base station and a target on which spatial bundling is not to be performed in a system to which the present invention is applied.

FIG. 42 is a schematically view illustrating an embodiment in which a terminal performs spatial bundling on the basis of a start point, performing direction of spatial bundling, and an end point determined by a base station and a target on which spatial bundling is not to be performed in a system to which the present invention is applied.

Referring to FIG. 42, while the BS may instruct the MS to perform spatial bundling, starting from the HARQ ACK/NACK signals with respect to the first detected subframe of SCC N, along a time axis, and perform spatial bundling up to HARQ ACK/NACK signals with respect to the second subframe of the PCC such that payload of the entire HARQ ACK/NACK signals is reduced to be smaller than 20 bits, the BS may also instruct the MS not to spatial-bundle HARQ ACK/NACK signals with respect to SCC 1, or the like, in the PCC of the first detected subframe, the SCC1 1 in the second subframe, and the like. Also, the BS may instruct the MS to perform partial bundling further on HARQ ACK/NACK signals with respect to a CC in a subframe not included in a path of spatial bundling.

Determination of Scheme of Partial Bundling and Transmission of Relevant Information Thereof.

As mentioned above, the BS may determine a performing scheme of partial bundling, e.g., a start point, a performing direction, an end point, and the like, of spatial bundling, in consideration of a channel environment, or the like.

Also, the BS may determine a target of partial bundling, e.g., determine HARQ ACK/NACK signals with respect to CCs in a which (certain) subframe as a target of spatial bundling, determine HARQ ACK/NACK signals with respect to CCs in a which (certain) subframe such that they are excluded from a target of spatial bundling, and the like.

The MS may determine a performing scheme and/or target of partial bundling according to a channel environment. For example, the MS may perform spatial bundling, starting from a CC exposed to a poor channel environment or a subframe exposed to a poor channel environment, and may add the CC or the subframe to spatial bundling or exclude them from spatial bundling.

The CC/subframe exposed to a poor channel environment may be selectively changed over time/frequency, so the BS may dynamically select a performing scheme and/or target of spatial bundling.

In the case in which the BS dynamically determines a performing scheme and/or a target of partial bundling according to a channel environment, the BS may recognize a channel environment on the basis of CQI information or RSRP/RSRQ information of each CC and/or a reception state of uplink data transmitted from the MS, and the like.

The BS may transmit information/instruction regarding the determined performing scheme and/or target of partial bundling to the MS through RRC signaling or on a PDCCH.

Figure 43:
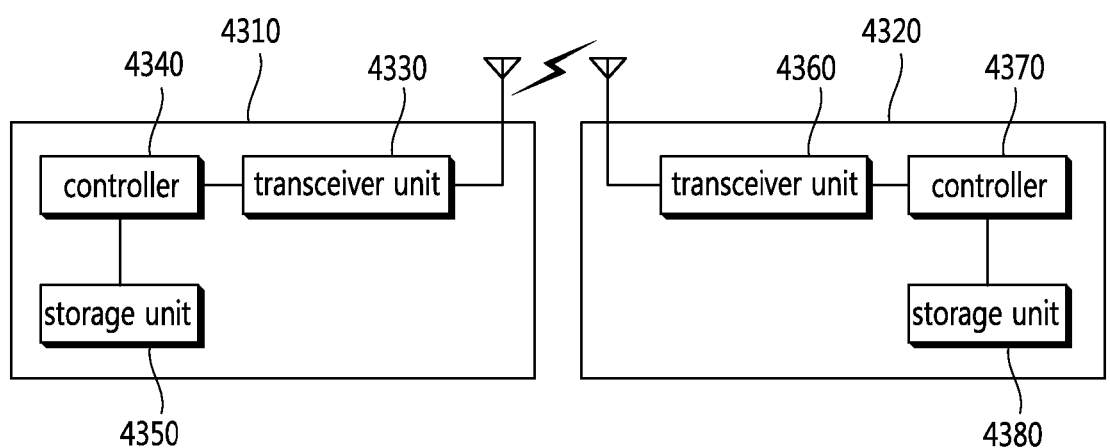
FIG. 43 is a block diagram illustrating an example of a configuration of a base station and a terminal in a system to which the present invention is applied.

FIG. 43 is a block diagram illustrating an example of a configuration of a base station and a terminal in a system to which the present invention is applied.

An MS 4310 may include a transceiver unit 4330, a storage unit 4350, and a controller 4340. A BS 4320 may include a transceiver unit 4360, a storage unit 4380, and a controller 4370.

The transceiver unit 4330 may receive information regarding an HARQ ACK/NACK signal configuration scheme from the BS 4320. Also, the transceiver unit 4330 may map bundled HARQ ACK/NACK signals to a PUCCH format 3 and transmit the same to the BS 4320, or transmit information (e.g., a CQI) regarding a downlink channel to the BS 4320.

The storage unit 4350 may store required information for the MS 430 to perform wireless communication in a network. The storage unit 4350 may store information/instruction regarding the HARQ ACK/NACK signal configuration scheme received from the BS, e.g., a scheme of spatial bundling and a bundling procedure based on a full bundling mode or a partial bundling mode. Also, the storage unit 4350 may measure measurement information to be reported to the BS, e.g., a CQI, an RSRP, an RSRQ, and the like, and store the same.

The controller 4340 may be connected to the transceiver unit 4330 and the storage unit 4350 and control them. The controller 4340 may perform spatial bundling on the basis of information regarding the HARQ ACK/NACK signal configuration scheme stored in the storage unit 4350, e.g., the information regarding the scheme and procedure of spatial bundling and configure an HARQ ACK/NACK signal to be transmitted.

For example, the controller 4340 may perform bundling on the basis of the bundling procedure described above with reference to FIGS. 28 to 42. For example, the controller 4340 may bundle HARQ ACK/NACK signals with respect to codewords of each CC sequentially, from a start CC to a final CC, along a frequency axis or a time axis. Here, the final CC is a CC at a point in which a payload size of the bundled HARQ ACK/NACK signals and unbundled HARQ ACK/NACK signals is equal to or smaller than a predetermined size, when the bundling is sequentially performed.

The transceiver unit 4360 transmits the information regarding the HARQ ACK/NACK signal configuration scheme to the MS 4310, and receives bundled HARQ ACK/NACK signals mapped to the PUCCH format 3 from the MS 4310.

The storage unit 4380 stores required information for the BS 4320 to perform wireless communication in a network. The storage unit 4380 may store information regarding a scheme of configuring HARQ ACK/NACK signals to be performed by the MS, e.g., information regarding a scheme of spatial bundling and a scheme of performing a full bundling mode and a partial bundling mode. Also, the storage unit 4380 may store measurement information transmitted from the MS, e.g., CQI, RSRP, RSRQ, and the like.

The controller 4370 may be connected to the transceiver unit 4360 and the storage unit 4380 and control them. The controller 4370 may recognize channel quality on the basis of a CQI, RSRP/RSRQ, or the like, indicating a channel state of a downlink transmitted from the MS 4310, and determine a scheme of configuring HARQ ACK/NACK signals, e.g., a spatial bundling scheme, to be performed by the MS, on the basis of the recognized channel state, the received uplink data, and the like.

For example, when the channel quality is worse than a predetermined reference state, the controller 4370 determines the scheme of the spatial bundling as a full bundling mode in which the HARQ ACK/NACK signals with respect to the plurality of codewords of each CC configured in the MS are fully bundled, and when the channel quality is not worse than a predetermined reference state, the controller 4370 determines the scheme of the spatial bundling as a partial bundling mode in which the HARQ ACK/NACK signals with respect to the plurality of codewords of each CC are partially bundled.

Also, on the basis of a transmission mode of a downlink (whether 1CW or 2CW is transmitted in a CC of a subframe) and an HARQ ACK/NACK signal configuration scheme transmitted to the MS, the controller 4370 may recognize the HARQ ACK/NACK signal configuration scheme transmitted from the MS, and decode the HARQ ACK/NACK signals.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

The invention claimed is:

1. A method for transmitting a Hybrid Automatic Repeat reQuest (HARQ) ACKnowledgement/Not-ACKnowledgement (ACK/NACK) signal by a mobile station in a multi-component carrier system, the method comprising:
   receiving a plurality of codewords in at least one component carrier of a downlink subframe from a base station;
   bundling HARQ ACK/NACK signals fully or partially with respect to the plurality of codewords, over the respective component carriers based on spatial bundling scheme; and
   transmitting the bundled HARQ ACK/NACK signals to the base station,
   wherein the spatial bundling scheme is selected on the basis of channel quality of a downlink.

2. The method of claim 1, wherein the selecting of the spatial bundling scheme comprises:
   when the channel quality is worse than a predetermined reference state, the HARQ ACK/NACK signals with respect to the plurality of codewords are fully bundled over each component carrier, and
   when the channel quality is not worse than a predetermined reference state, the HARQ ACK/NACK signals with respect to the plurality of codewords are partially bundled over each component carrier.

3. The method of claim 1, wherein the bundled HARQ ACK/NACK signals are transmitted on a physical uplink control channel (PUCCH) in a format having capacity equal to or smaller than 20 bits.

4. The method of claim 1, wherein the bundling of the HARQ ACK/NACK signals includes bundling the HARQ ACK/NACK signals with respect to the codewords of each component carrier sequentially, from a start component carrier to a final component carrier, along a frequency axis or time axis.

5. The method of claim 4, wherein the final component carrier is a component carrier of a point in which a payload size of the bundled HARQ ACK/NACK signals and unbundled HARQ ACK/NACK signals is equal to or smaller than a predetermined size, when the bundling is sequentially performed.

6. A mobile station for transmitting a Hybrid Automatic Repeat reQuest (HARQ) ACKnowledgement/Not-ACKnowledgement (ACK/NACK) signal in a multi-component carrier system, the mobile station comprising:
   a transceiver unit configured to receive a plurality of codewords in at least one component carrier of a downlink subframe from a base station (BS) and transmit bundled HARQ ACK/NACK signals to the BS; and
   a controller configured to fully or partially bundle the HARQ ACK/NACK signals with respect to the plurality of codewords over each component carrier on the basis of a spatial bundling scheme,
   wherein the controller selects the spatial bundling scheme on the basis of channel quality of a downlink.

7. The mobile station of claim 6, wherein
   when the channel quality is worse than a predetermined reference state, the controller fully bundles the HARQ ACK/NACK signals with respect to the plurality of codewords, over each component carrier, and
   when the channel quality is not worse than a predetermined reference state, the controller partially bundles the HARQ ACK/NACK signals with respect to the plurality of codewords, over each component carrier.

8. The mobile station of claim 6, wherein the transceiver unit transmits the bundled HARQ ACK/NACK signals on a physical uplink control channel (PUCCH) having capacity equal to or smaller than 20 bits.

9. The mobile station of claim 6, wherein the controller bundles the HARQ ACK/NACK signals with respect to the codewords of each component carrier sequentially, from a start component carrier to a final component carrier, along a frequency axis or time axis.

10. The mobile station of claim 9, wherein the final component carrier is a component carrier of a point in which a payload size of the bundled HARQ ACK/NACK signals and unbundled HARQ ACK/NACK signals is equal to or smaller than a predetermined size, when the bundling is sequentially performed.

11. A method for receiving a Hybrid Automatic Repeat reQuest (HARQ) ACKnowledgement/Not-ACKnowledgement (ACK/NACK) signal by a base station in a multi-component carrier system, the method comprising:
   recognizing quality of a downlink channel on the basis of uplink information transmitted from a mobile station;
   determining a scheme of spatial bundling on the basis of the quality of the downlink channel;
   transmitting information regarding an HARQ ACK/NACK signal configuration scheme indicating the determined scheme of spatial bundling to the mobile station; and
   receiving bundled HARQ ACK/NACK signals generated on the basis of the information regarding the HARQ ACK/NACK signal configuration scheme from the mobile station.

12. The method of claim 11, wherein in the determining of the scheme of the spatial bundling,
   when the channel quality is worse than a predetermined reference state,
   the scheme of the spatial bundling is determined as a full bundling mode in which the HARQ ACK/NACK signals with respect to the plurality of codewords of each component carrier configured in the mobile station are fully bundled, and
   when the channel quality is not worse than a predetermined reference state, the scheme of the spatial bundling is determined as a partial bundling mode in which the HARQ ACK/NACK signals with respect to the plurality of codewords of each component carrier are partially bundled.

13. The method of claim 11, wherein the bundled HARQ ACK/NACK signals are received on a physical uplink control channel (PUCCH) in a format having capacity equal to or smaller than 20 bits.

14. A base station for receiving a Hybrid Automatic Repeat reQuest (HARQ) ACKnowledgement/Not-ACKnowledgement (ACK/NACK) signal in a multi-component carrier system, the base station comprising:
   a transceiver unit configured to receive uplink information indicating downlink channel quality from a mobile station and receive bundled HARQ ACK/NACK signals generated on the basis of information regarding a HARQ ACK/NACK signal configuration scheme from the mobile station; and
   a controller configured to recognize quality of the downlink channel on the basis of the uplink information and determine a scheme of spatial bundling on the basis of the quality of the uplink channel,
   wherein the transceiver unit transmits information regarding the HARQ ACK/NACK signal configuration scheme indicating the determined scheme of spatial bundling to the mobile station.

15. The base station of claim 14, wherein
when the channel quality is worse than a predetermined reference state,
the controller determines the scheme of the spatial bundling as a full bundling mode in which the HARQ ACK/NACK signals with respect to the plurality of codewords of each component carrier configured in the mobile station are fully bundled, and
when the channel quality is not worse than a predetermined reference state, the controller determines the scheme of the spatial bundling as a partial bundling mode in which the HARQ ACK/NACK signals with respect to the plurality of codewords of each component carrier are partially bundled.

16. The base station of claim 14, wherein the transceiver unit receives the bundled HARQ ACK/NACK signals on a physical uplink control channel (PUCCH) in a format having capacity equal to or smaller than 20 bits.

* * * * *